US012784561B2

(12) United States Patent
Zhang et al.

(10) Patent No.: US 12,784,561 B2
(45) Date of Patent: Nov. 3, 2026

(54) METHOD AND SYSTEM FOR INTERACTIVELY SEARCHING FOR TARGET OBJECT AND STORAGE MEDIUM

(71) Applicant: BOE Technology Group Co., Ltd., Beijing (CN)

(72) Inventors: Ning Zhang, Beijing (CN); Yu Gu, Beijing (CN); Yue Li, Beijing (CN); Xiaozhen Jia, Beijing (CN); Fanhao Kong, Beijing (CN); Xiao Chu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 6 days.

(21) Appl. No.: 18/580,142

(22) PCT Filed: Feb. 28, 2023

(86) PCT No.: PCT/CN2023/078791

§ 371 (c)(1),
(2) Date: Jan. 17, 2024

(87) PCT Pub. No.: WO2023/160722

PCT Pub. Date: Aug. 31, 2023

(65) Prior Publication Data

US 2025/0046164 A1 Feb. 6, 2025

(30) Foreign Application Priority Data

Feb. 28, 2022 (CN) ......................... 202210186752.6

(51) Int. Cl.
*G08B 13/196* (2006.01)
*G06T 7/70* (2017.01)

(52) U.S. Cl.
CPC .......... *G08B 13/19602* (2013.01); *G06T 7/70* (2017.01)

(58) Field of Classification Search
USPC ........... 382/100–225; 701/1–124, 29.1–32.3, 701/400–539, 300–302; 706/1–62,
(Continued)

(56) References Cited

U.S. PATENT DOCUMENTS 5,146,228 A 9/1992 Irani et al.
10,317,910 B2 * 6/2019 Stein .................... G05D 1/0276
(Continued)

FOREIGN PATENT DOCUMENTS

CN 105333878 A 2/2016
CN 105825703 A 8/2016
(Continued)

OTHER PUBLICATIONS

Zhang, Wei; Target Tracking Method and Device; 2016 (Year: 2016).*

(Continued)

*Primary Examiner* — Marcellus J Augustin
(74) *Attorney, Agent, or Firm* — IPro, PLLC

(57) ABSTRACT

Provided are a method and system for interactively searching for a target object and a storage medium. The method includes: obtaining a first interactive instruction from a first terminal; determining a target object corresponding to the first interactive instruction; obtaining target information of the target object; where the target information includes at least one of: a current position of the target object, picture information of the current position, a historical trajectory of the target object, a navigation route, or any combination thereof; sending the target information to the first terminal such that the first terminal displays the target information.

19 Claims, 11 Drawing Sheets

(58) Field of Classification Search
USPC .................................................. 706/900–905
See application file for complete search history.

(56) References Cited

U.S. PATENT DOCUMENTS

| | | | | |
|---|---|---|---|---|
| 11,693,431 | B2 * | 7/2023 | Wen | G01R 29/10 701/4 |
| 2004/0071368 | A1 | 4/2004 | Chadha et al. | |
| 2010/0059622 | A1 * | 3/2010 | Rastegar | F41G 7/305 701/469 |
| 2021/0055109 | A1 * | 2/2021 | Teng | G01C 21/12 |
| 2025/0200760 | A1 * | 6/2025 | Dong | G06T 7/136 |

FOREIGN PATENT DOCUMENTS

| | | | |
|---|---|---|---|
| CN | 106529456 | A | 3/2017 |
| CN | 107967457 | A | 4/2018 |
| CN | 109492604 | A | 3/2019 |
| CN | 110298269 | A | 10/2019 |
| CN | 111047621 | A | 4/2020 |
| CN | 111664866 | A | 9/2020 |
| CN | 111783724 | A | 10/2020 |
| CN | 111814657 | A | 10/2020 |
| CN | 111986332 | A | 11/2020 |
| CN | 112950790 | A | 6/2021 |
| CN | 112985419 | A | 6/2021 |
| CN | 113115216 | A | 7/2021 |
| CN | 113358125 | A | 9/2021 |
| CN | 113494909 | A | 10/2021 |
| CN | 113566846 | A | 10/2021 |
| CN | 113569911 | A | 10/2021 |
| CN | 114297534 | A | 4/2022 |

OTHER PUBLICATIONS

Lee Jin Kyo; Driver Assistance Apparatus and Control Method for the Same; 2016 (Year: 2016).*
PCT/CN2023/078791 international search report dated May 17, 2023.
PCT/CN2023/078791 Written Opinion dated May 17, 2023.
CN2022101867526 first office action dated Apr. 15, 2022.
Mikhail, Maged, and Nathan Carmack. "Navigation software system development for a mobile robot to avoid obstacles in a dynamic environment using laser sensor." SoutheastCon 2017. IEEE, 2017.
Ze Lin. "Research on Visual SLAM Technology for Automatic Parking Environment.", A thesis for master's degree. Jilin University. Jun. 2020.

* cited by examiner

METHOD AND SYSTEM FOR INTERACTIVELY SEARCHING FOR TARGET OBJECT AND STORAGE MEDIUM

CROSS-REFERENCE TO RELATED APPLICATIONS

This application is a national stage of international PCT Application No. PCT/CN2023/078791 filed on Feb. 28, 2023, the entire contents of which are incorporated herein by reference.

TECHNICAL FIELD

The present disclosure relates to the field of data processing technologies and in particular to a method and system for interactively searching for a target object and a storage medium.

BACKGROUND

Along with rapid development of the security protection technologies, a security protection system is deployed in many key regions. The cameras in the security protection system may perform all-weather monitoring for security protection regions by collecting and recording videos. Furthermore, the existing security protection systems also allow users to plan a region as a forbidden region in a video picture at a webpage end (e.g. web end) and thus carry out key monitoring for the forbidden region.

SUMMARY

The present disclosure provides methods and system for interactively searching for a target object and a storage medium, so as to solve the shortcomings in the related arts.

According to one aspect, there is provided a method of interactively searching for a target object, which is applied to a server side and includes:

- obtaining a first interactive instruction from a first terminal;
- determining a target object corresponding to the first interactive instruction;
- obtaining target information of the target object; where the target information is selected from a group consisting of a current position of the target object, picture information of the current position, a historical trajectory of the target object, a navigation route, and any combination thereof;
- sending the target information to the first terminal such that the first terminal displays the target information.

In some embodiments, the first interactive instruction includes: coordinate data of a recognition region, user data obtained by code scanning, or both.

In some embodiments, determining the target object corresponding to the first interactive instruction includes:

- obtaining a current image corresponding to the first interactive instruction; where the current image includes a current video frame or image frame specified when the first interactive instruction is input, or an image uploaded when the first interactive instruction is input;
- recognizing a target object in the current image to obtain a position image of a position of the target object;
- extracting a feature vector of the position image and representing the target object by using the feature vector of the position image.

In some embodiments, determining the target object corresponding to the first interactive instruction includes:

- obtaining a multimedia file address corresponding to the first interactive instruction;
- based on the multimedia file address, obtaining a first video frame;
- based on coordinate data of a recognition region comprised in the first interactive instruction and the first video frame, determining a position image corresponding to the recognition region; and
- extracting a feature vector of the position image and representing the target object by using the feature vector of the position image.

In some embodiments, obtaining the target information of the target object includes:

- obtaining a first terminal device serial number corresponding to the first interactive instruction;
- based on the first terminal device serial number, obtaining a peripheral device serial number of a peripheral device around at least one second terminal around the first terminal, and taking the peripheral device serial number and the feature vector of the position image as the target information of the target object.

In some embodiments, the method further includes:

- sending the feature vector and the peripheral device serial number to a specified storage zone; where the specified storage zone includes: a message queue, an object database, or both.

In some embodiments, obtaining the target information of the target object includes:

- obtaining a current image corresponding to the first interactive instruction; where the current image includes a current video frame or image frame specified when the first interactive instruction is input, or an image uploaded when the first interactive instruction is input;
- based on a predetermined second mapping relationship between the first terminal and a second terminal, obtaining scenario information of a scenario where the second terminal is located according to position data of second terminals distributed at different positions; and
- based on the scenario information, obtaining the target information of the target object.

In some embodiments, the scenario information includes: an image collected by the second terminal, a scenario element, or both; where the scenario element includes: a second terminal device serial number, a peripheral device serial number of a peripheral device around the second terminal, or both.

In some embodiments, when the scenario information includes picture information and obtaining the target information of the target object based on the scenario information includes:

- obtaining at least one object of the picture information in the scenario information, where the at least one object comprises the target object; and
- based on a time sequence in which the target object appears in each piece of scenario information, generating a historical trajectory of the target object and taking the historical trajectory as the target information of the target object.

In some embodiments, the scenario information includes picture information and obtaining the target information of the target object based on the scenario information includes:

- extracting at least one object of the picture information in the scenario information and obtaining a position image corresponding to each object;

determining a target position image matching the current image; and based on a correspondence between the scenario information and the second terminal, determining position data of the second terminal corresponding to the target position image, and taking the position data of the second terminal as the target information of the target object.

In some embodiments, the target information includes the navigation route, and obtaining the target information of the target object based on the scenario information further includes:

obtaining position data of the first terminal; and based on the position data of the first terminal and the position data of the second terminal corresponding to the target position image, determining a navigation route between the first terminal and the second terminal, and taking the navigation route as the target information of the target object.

In some embodiments, the target information further includes a navigation identifier, and obtaining the target information of the target object based on the scenario information further includes:

based on an orientation of the first terminal and the navigation route, generating a navigation identifier and taking the navigation identifier as the target information of the target object; where the navigation identifier is used to assist a user in determining a movement route and a movement direction.

In some embodiments, the target information includes the current position of the target object, and obtaining the target information of the target object includes:

obtaining position data of at least three reference signal sources close to the first terminal; where the reference signal sources are disposed in advance at known positions; and based on the position data of at least three reference signal sources, determining position data of the first terminal and taking the position data of the first terminal as the current position of the target object.

In some embodiments, obtaining the position data of at least three reference signal sources close to the first terminal includes:

obtaining signal strengths of reference signals received by the first terminal from reference signal sources;

sorting the signal strengths and selecting reference signal sources corresponding to at least three signal strengths based on a descending order to obtain the position data of the at least three reference signal sources.

In some embodiments, based on the position data of at least three reference signal sources, determining the position data of the first terminal includes:

obtaining a distance between the first terminal and each of the at least three reference signal sources;

based on the position data of at least three reference signal sources and corresponding distances, calculating coordinate data of the first terminal to obtain the position data of the first terminal.

In some embodiments, calculating the position data of the first terminal is based on predetermined weighted centroid algorithm.

In some embodiments, the formula of a weighted centroid algorithm is as follows:

$$x_b = \frac{\frac{x_1}{d_1} + \frac{x_2}{d_2} + \frac{x_3}{d_3}}{\frac{1}{d_1} + \frac{1}{d_2} + \frac{1}{d_3}}$$

-continued $$y_b = \frac{\frac{y_1}{d_1} + \frac{y_2}{d_2} + \frac{y_3}{d_3}}{\frac{1}{d_1} + \frac{1}{d_2} + \frac{1}{d_3}}$$

where $x_b$, $y_b$ refer to an abscissa and an ordinate of the position of the first terminal respectively, $x_1$, $x_2$, $x_3$ refer to abscissas of a first reference signal source, a second reference signal source and a third reference signal source respectively, $y_1$, $y_2$, $y_3$ refer to ordinates of the first reference signal source, the second reference signal source and the third reference signal source respectively, $d_1$, $d_2$, $d_3$ refer to distances between the first terminal and the first reference signal source, the second reference signal source and the third reference signal source respectively.

In some embodiments, the scenario information includes picture information and obtaining the target information of the target object based on the scenario information includes:

obtaining picture information of the second terminal closest to the first terminal and taking the picture information as the target information of the target object.

In some embodiments, the scenario information includes picture information and obtaining the target information of the target object based on the scenario information includes:

obtaining picture information of the second terminal closest to the first terminal; and based on the picture information, obtaining target sub-map data of a place where the second terminal is located and taking the target sub-map data as the target information of the target object.

In some embodiments, based on the picture information, obtaining the target sub-map data of the place where the second terminal is located includes:

obtaining a feature vector of the picture information;

matching the feature vector of the picture information with feature vectors in a predetermined visual sub-map database to obtain a feature vector with maximum similarity; and obtaining sub-map data corresponding to the feature vector with maximum similarity to obtain the target sub-map data.

In some embodiments, the target sub-map data includes: map data, map recognition code, or both.

In some embodiments, matching the feature vector of the picture information with the feature vectors in the predetermined visual sub-map database to obtain the feature vector with maximum similarity includes:

obtaining a feature point of the picture information and determining a classification of the feature point;

obtaining sub-map data of the classification in the visual sub-map database; and matching the feature vector of the picture information with feature vectors in the sub-map data of the classification to obtain a feature vector with maximum similarity.

In some embodiments, obtaining the target information of the target object includes:

determining a recognition region corresponding to the first interactive instruction, where the target object is located within the recognition region; and obtaining second coordinate data of the recognition region and taking the second coordinate data of the recognition region as the target information of the target object.

In some embodiments, obtaining the second coordinate data of the recognition region includes:

obtaining first coordinate data of each vertex in the recognition region; where the first interactive instruction is the first coordinate data of the recognition region, and the first coordinate data is located within a predetermined range; and adjusting the first coordinate data of each vertex based on a size of a picture in the first terminal to obtain the second coordinate data.

In some embodiments, the scenario information includes picture information and based on the position data of the second terminals distributed at different positions and the second mapping relationship, obtaining the scenario information of the scenario of the second terminal includes:

obtaining a feature vector of the current image corresponding to the first interactive instruction;

obtaining candidate feature vectors matching the feature vector of the current image in an object database to obtain a target feature vector, where the object database includes candidate feature vectors corresponding to picture information uploaded by the second terminal in the second mapping relationship with the first terminal; and obtaining the picture information corresponding to the target feature vector and taking the picture information as the scenario information.

In some embodiments, obtaining the candidate feature vectors matching the feature vector of the current image in the object database to obtain the target feature vector includes:

updating the object database, where the object database includes candidate feature vectors;

matching the feature vector of the target object with the candidate feature vectors in the object database to obtain a first number of candidate feature vectors; and obtaining a candidate feature vector with maximum similarity as the target feature vector from the first number of candidate feature vectors.

In some embodiments, the object database includes a first database and updating the object database includes:

obtaining a current image where the target object is located, where the current image is a first image of a current stream address corresponding to the first interactive instruction;

recognizing a second number of objects in the first image to obtain a second number of position images;

extracting a feature of each position image to obtain a second number of feature vectors; and updating the second number of feature vectors to the first database and obtaining feature vector IDs.

In some embodiments, the object database includes a second database and updating the object database further includes:

storing the second number of position images into the second database and obtaining an accessible URL address of each position image returned by the second database and a feature vector ID generated when the feature vector of each position image is updated to the first database; and based on the feature vector ID and the URL address, generating a second number of pieces of data and storing the second number of pieces of data into the second database.

In some embodiments, sending the target information to the first terminal includes:

based on the target information, processing multimedia files of a second terminal to obtain a target multimedia file including the target information; and pushing the target multimedia file to the first terminal.

In some embodiments, the method further includes:

when detecting that the target object is out of a picture of the first terminal, obtaining a peripheral device serial number of a peripheral device around at least one second terminal around the first terminal and a feature vector of the target object; and based on the peripheral device serial number and the feature vector of the target object, re-obtaining the target information of the target object.

In some embodiments, the method further includes:

when detecting a second interactive instruction from the first terminal, stopping obtaining the target information of the target object.

In some embodiments, stopping obtaining the target information of the target object includes:

obtaining a peripheral device serial number of a peripheral device around a second terminal bound to the first terminal; and restoring a multimedia file of the second terminal corresponding to the peripheral device serial number into an original multimedia file and clearing corresponding stored data.

According to another aspect, there is provided a method of interactively searching for a target object, which is applied to a first terminal side. The method includes:

in response to a trigger operation of a user, generating and obtaining a first interactive instruction and sending the first interactive instruction to a server such that the server obtains target information of a target object corresponding to the first interactive instruction;

displaying the target information of the target object in a current display picture.

In some embodiments, the first interactive instruction includes: coordinate data of a recognition region, user data obtained by code scanning, or both.

In some embodiments, the target information includes at least one of: a current position of the target object, picture information of the current position, a historical trajectory of the target object, a navigation route for searching for the target object, or any combination thereof.

In some embodiments, the first terminal further includes an offline predetermined visual sub-map database, and when the target information includes a sub-map recognition code of a target sub-map, displaying the target information of the target object includes:

matching the sub-map recognition code with sub-maps in the predetermined visual sub-map database to obtain a visual sub-map; and displaying the visual sub-map.

In some embodiments, the target information includes the navigation route and displaying the target information of the target object includes:

superimposing the navigation route onto the visual sub-map for displaying.

In some embodiments, the target information includes a navigation identifier and displaying the target information of the target object includes:

based on an orientation of the first terminal and the navigation route, generating a navigation identifier, where the navigation identifier is used to assist a user in determining a movement route and a movement direction; and superimposing the navigation identifier onto the visual sub-map for displaying.

In some embodiments, the method further includes:

in response to a trigger operation of the user, generating and obtaining a second interactive instruction, and sending the second interactive instruction to the server such that the server stops obtaining the target information of the target object in response to the second interactive instruction.

According to another aspect, there is provided a system for interactively searching for a target object, including a server, a first terminal and a second terminal; where, the first terminal is used to obtain a first interactive instruction and send the first interactive instruction to the server and display target information of a target object corresponding to the first interactive instruction;

the second terminal is used to collect an image and upload the image to the server; and the server is used to determine the target information of the target object corresponding to the first interactive instruction and feed the target information back to the first terminal.

In some embodiments, the second terminal includes at least one of: a mobile terminal, a vertical screen, a spliced screen, a camera, or any combination thereof.

In some embodiments, the server includes a feature vector obtaining module, a feature vector search engine and an object database;

the feature vector obtaining module is configured to obtain a target object in a current image corresponding to the first interactive instruction and convert a position image of a position of the target object into a feature vector to obtain a target feature vector;

the object database is configured to store a position image and a feature vector of the position image, where the position image is an image of an object obtained by recognizing the image collected by the second terminal; and the feature vector search engine is configured to match the target feature vector with the feature vectors in the object database to obtain a feature vector with maximum similarity and a corresponding position image; and based on the position image, determine the target information of the target object.

According to another aspect, there is provided with a security protection system, which includes a first terminal, a second terminal and a server. The server includes:

a processor; and a memory storing computer programs executable by the processor;

where the processor is configured to execute the computer programs in the memory to perform the above methods.

According to another aspect, there is provided with a first terminal, including:

a processor;

a memory storing computer programs executable by the processor;

where the processor is configured to execute the computer programs in the memory to perform the above methods.

According to another aspect, there is provided with a computer readable storage medium, wherein executable computer programs in the storage medium are executed by a processor to perform the above methods.

The technical solutions of the present disclosure have the following beneficial effects.

In the solutions provided by the present disclosure, after the first interaction instruction is obtained from the first terminal, the target object corresponding to the first interactive instruction is determined; then, the target information of the target object is obtained, where the target information includes at least one of: a current position of the target object, picture information of the current position, a historical trajectory of the target object, a navigation route, or any combination thereof; finally, the target information is sent to the first terminal, such that the first terminal displays the target information. Thus, the target information of the target object can be obtained and displayed to help the user to search for the target object, thereby increasing the searching efficiency and the use experiences.

It should be understood that the above general descriptions and subsequent detailed descriptions are merely illustrative and explanatory rather than limiting of the present disclosure.

BRIEF DESCRIPTION OF DRAWINGS

In order to more clearly describe the technical solutions of the embodiments of the present disclosure, the drawings required for descriptions of the embodiments will be briefly introduced. Apparently, the drawings described hereunder are only some embodiments of the present disclosure. Those skilled in the arts can obtain other drawings based on these drawings without making creative work.

DETAILED DESCRIPTION

The technical solutions of the embodiments of the present disclosure will be fully and clearly described below in combination with the drawings in the embodiments of the present disclosure. Apparently, the embodiments described herein are only some embodiments of the present disclosure rather than all embodiments. All other embodiments obtained by those skilled in the arts based on these embodiments in the present disclosure without making creative work shall fall within the scope of protection of the present disclosure.

In order to solve the above technical problems, the present disclosure provides a method of interactively searching for a target object, which may be applied to a system for interactively searching for a target object. In some embodiments, the system for interactively searching a target object may include a first terminal, a second terminal and a server. The first terminal may be a device for displaying a picture for a user to search for an object and inputting an interactive instruction, for example, a smart phone, a tablet computer, a personal computer, a vertical screen, a spliced screen, or a joint terminal or the like for the user to perform trigger operation. The second terminal may include a plurality of devices having image collection function, for example, a camera, a vertical screen or the like, which can upload multimedia files such as a collected image or video stream, or an uploaded picture or video stream to the server. The server may be implemented by at least one server or a server cluster and can process the images uploaded by the second terminal upon receiving an interactive instruction from the first terminal so as to obtain target information of the target object and send it to the first terminal for displaying. In subsequent embodiments, the solutions of the embodiments will be described with the server performing a method of interactively searching for a target object, but the solutions do not constitute any limitation.

Figure 1:
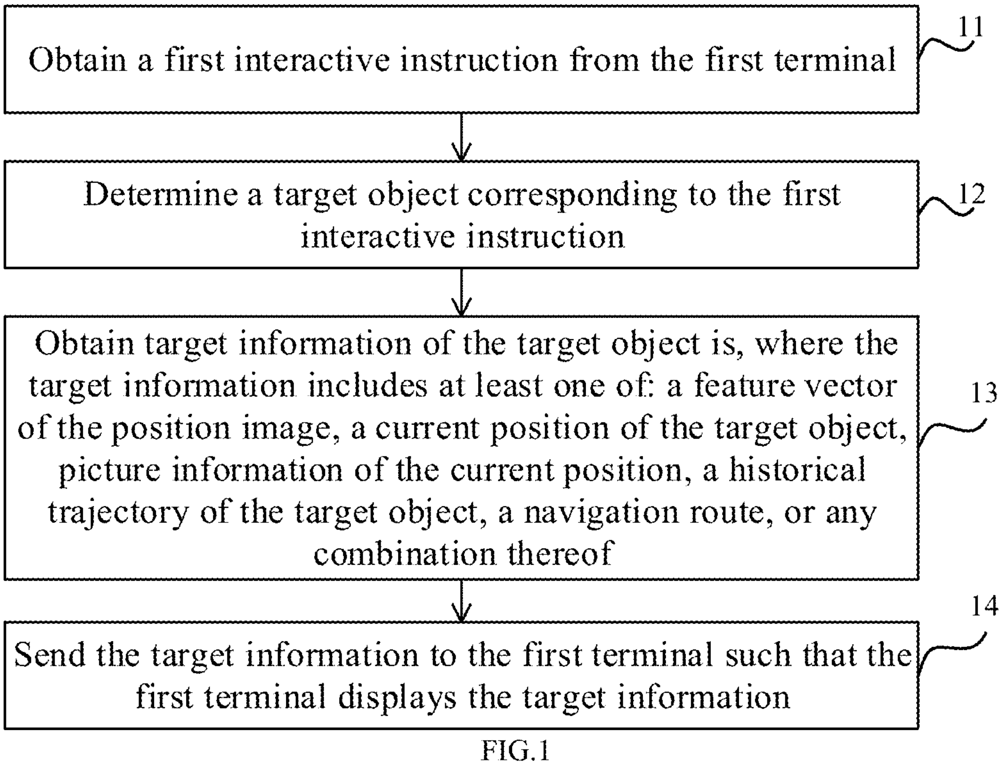
FIG. 1 is a flowchart illustrating a method of interactively searching for a target object according to some embodiments of the present disclosure.

FIG. 1 is a flowchart illustrating a method of interactively searching for a target object according to some embodiments of the present disclosure. As shown in FIG. 1, there is provided a method of interactively searching for a target object. The method includes steps 11 to 14.

At step 11, a first interactive instruction is obtained from the first terminal.

In some embodiments, when displaying a picture, the first terminal may detect whether a user triggers a touch screen of the first terminal. When an interactive instruction is to be input, the user may perform trigger operation on an interactive interface of the first terminal to input the interactive instruction. The above interactive instruction may include but not limited to coordinate data of a recognition region, an image of a recognition object, a stored image, user data obtained by code scanning, and user feature data obtained by recognizing the collected user image and the like, which can be selected based on specific scenarios and not limited herein. For ease of descriptions, in the present disclosure, an instruction for establishing a task is referred to as the first interactive instruction and an instruction for cancelling the previous instruction for establishing the task is referred to as a second interactive instruction.

With a person searching scenario as an example, the first interactive instruction may be coordinate data of a recognition region. For example, in a case of a person-searching requirement, the user may click on several positions on the interactive interface to form a polygon, i.e. a recognition box. The region in the recognition box is the recognition region. The recognition region includes a to-be-recognized object. At this time, the first terminal may obtain coordinate data of the recognition region (representing the coordinate data of the recognition region by using the coordinate data of vertices of the recognition region) and send the coordinate data as the first interactive instruction to the server.

With another person-searching scenario as an example, the first interactive instruction may be a position image of a recognition object. For example, in a case of a person-searching requirement, the user may select an upload button in the interactive interface and select one picture containing a to-be-searched object. The first terminal may recognize each object in the image based on a predetermined recognition algorithm and generate a minimum bounding box of each object, and then based on the minimum bounding box, crop the above image to obtain a position image corresponding to each object. The first terminal may upload the position image of the recognition object as the first interactive instruction to the server. Thus, the server can obtain the above first interactive instruction.

With a vehicle-searching scenario in a parking lot as an example, the first interactive instruction may be user data obtained by code scanning. For example, in a case of a vehicle-searching requirement in the parking lot, the first terminal may display a code scanning interface or a two-dimensional code in the interactive interface in response to a trigger operation of the user. For example, if a code-scanning interface is displayed, the first terminal may scan the two-dimensional code displayed on the vertical screen of the second terminal to establish communication with the vertical screen, upload user data, and establish a mapping relationship, where the user data may include at least one piece of information entered by the user during registration, for example, a name, a user name, a vehicle plate number and a first terminal recognition code and the like. The first terminal may send the user data as the first interactive instruction to the server through the vertical screen. Thus, the server can obtain the above first interactive instruction.

With another vehicle-searching scenario in a parking lot as an example, the first interactive instruction may be user feature data obtained by recognizing a user image collected by a camera with the user's knowledge. For example, in a case of a vehicle-searching requirement in the parking lot, the first terminal may switch from the interactive interface to a shooting interface in response to a trigger operation of the user and shoot an image upon appearance of a face in the shooting interface; based on a predetermined image recognition model, recognize the image to obtain user feature data. The first terminal may be a terminal device held by the user or a device such as a vertical screen in the parking lot, which may be set based on specific scenarios. Finally, the vertical screen in the parking lot may send the user feature data as the first interactive instruction to the server. Thus, the server can obtain the above first interactive instruction.

Figure 2:
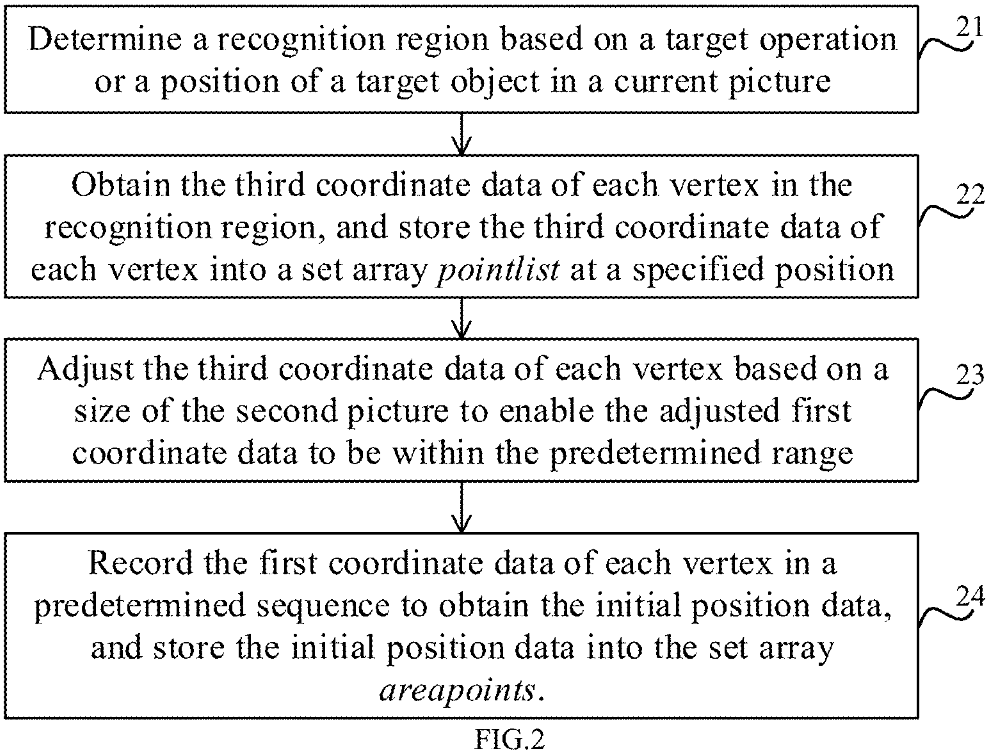
FIG. 2 is a flowchart of obtaining initial position data according to some embodiments of the present disclosure.

It should be noted that in some embodiments, the first terminal may directly send the coordinate data of the recognition region as the first interactive instruction to the server, or send the initial coordinate data as the first interactive instruction to the server, where the value of the coordinate data of each vertex in the initial coordinate data is within a predetermined range which is [0,1]. Thus, as shown in FIG. 2, obtaining the initial coordinate data of the recognition region by the first terminal may include steps 21 to 24.

At step 21, the first terminal determines a recognition region based on a target operation or a position of a target object in a current picture (referred to as second picture below). In practical applications, if setting a recognition region is needed, the user usually clicks on a plurality of points continuously in the second picture on a display (current picture or presented by a browser), where these points are taken as vertices for enclosing a recognition region.

In other words, the recognition region usually has a plurality of vertices which are sequentially connected to form one polygon. A region inside the polygon forms a recognition region, for example, a triangular region, a tetragon region or the like. In some embodiments, first coordinate data of each vertex is within a predetermined range which is [0, 1]; or, a reference picture is set, where the upper left corner of the reference picture is set to origin (0, 0), and the lower right corner of the reference picture is set to (1, 1); and thus, the initial position data of the recognition region is the coordinate data of the above reference picture.

Figure 3:
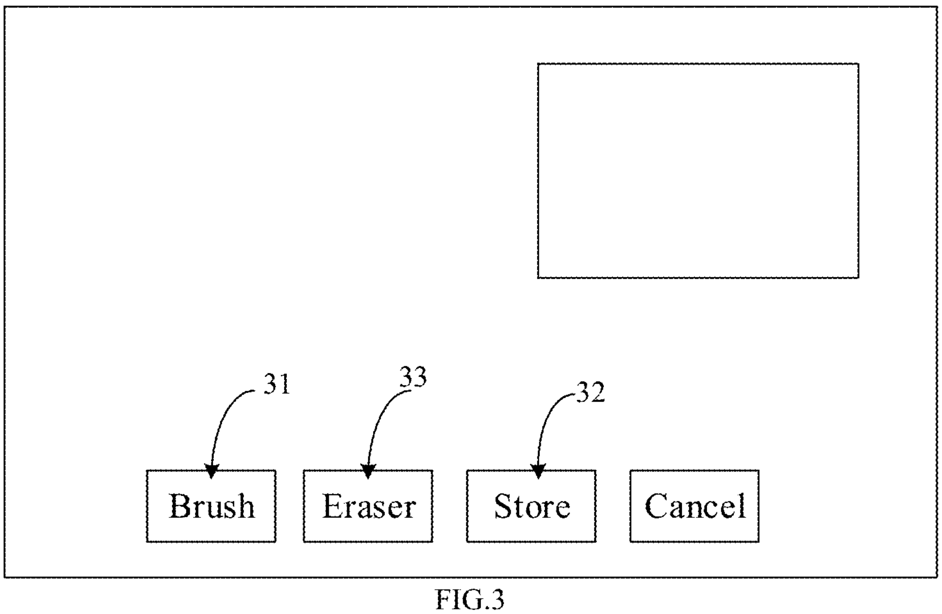
FIG. 3 is an effect diagram illustrating an interactive interface according to some embodiments of the present disclosure.

In some embodiments, functional components are usually disposed in the interactive interface. When detecting an operation for selecting a function component in the second picture, the first terminal may display an interactive interface corresponding to the above functional component. The interactive interface may include a brush component and a store component. As shown in FIG. 3, the interactive interface may include a brush component 31 and a store component 32.

When detecting an operation for selecting the brush component, the first terminal may obtain a trigger position of the brush component in the second picture and take the trigger position as one vertex of a recognition region. At this time, third coordinate data of the trigger position can be obtained.

Figure 4A:
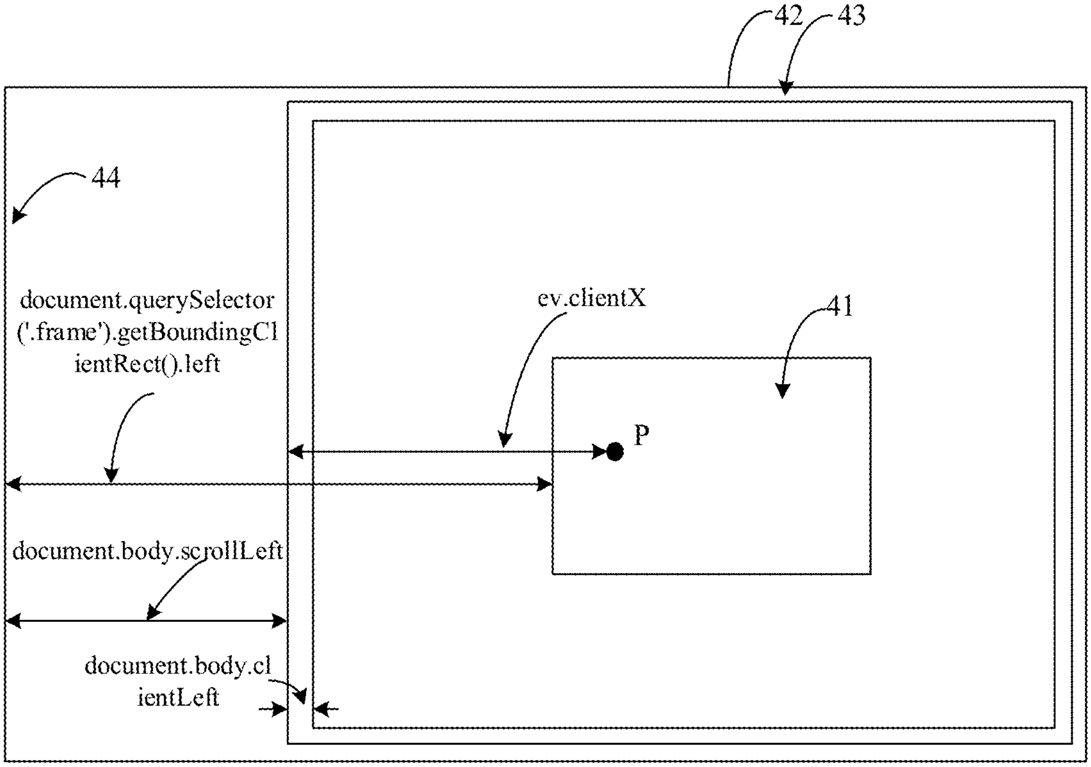
FIG. 4A is an effect diagram of determining an abscissa of a recognition-matching vertex according to some embodiments of the present disclosure.
Figure 4B:
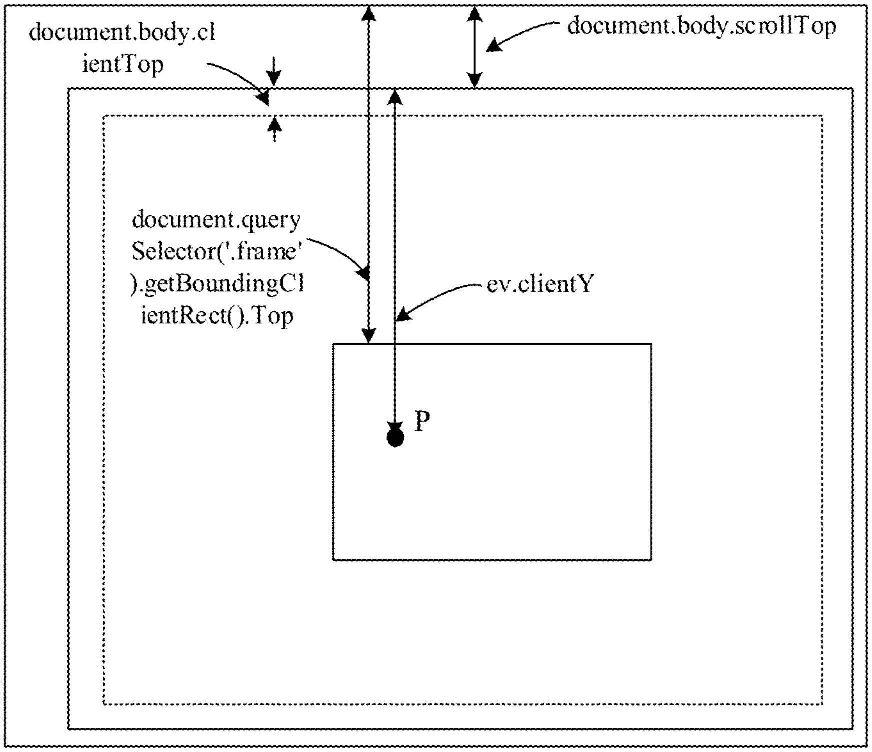
FIG. 4B is an effect diagram of determining an ordinate of a recognition-matching vertex according to some embodiments of the present disclosure.

With obtaining one vertex P of the recognition region as an example, as shown in FIGS. 4A and 4B, a display screen 42 of the first terminal displays a browser 43 in full screen; a second picture 41 is displayed within the browser 43, where the trigger position P within the second picture 41 is taken as the above vertex P; a file 44 is displayed within the browser 43. In this case, the third coordinate data of the trigger position P is as follows:

abscissa $x$=ev.clientX+document.body.scrollLeft−document.body.clientLeft−document.querySelector('.frame').getBoundingClientRecto.left;

$x$=distance of the vertex $P$ from the left side of the window (i.e. ev.clientX)+width of the page hidden at the left side of the scroll bar when the page is moved to the right side by the scroll bar (i.e. document.body.scrollLeft)−width of the left side of the region in which contents are seen through the browser (i.e. document.body.clientLeft)−distance of the second picture from the left side of the window (document.querySelector('.frame').getBoundingClientRecto.left).

ordinate $y$=ev.clientY+document.body.scrollTop−document.body.clientTop−document.querySelector('.frame').getBoundingClientRecto.Top;

$y$=distance of the vertex from the top of the window (i.e. ev.clientY)+width of the page hidden at the top end of the scroll bar when the page is moved to the bottom end by the scroll bar (i.e. document.body.scrollTop)−width of the top of the region in which contents are seen through the browser (i.e. document.body.clientTop)−distance of the second picture from the top of the window (document.querySelector('.frame').getBoundingClientRect( ).Top).

At step 22, the first terminal obtains the third coordinate data of each vertex in the recognition region, and stores the third coordinate data of each vertex into a set array pointlist at a specified position. In this step, after obtaining the third coordinate data of the trigger position, the first terminal may store the third coordinate data into the set array pointlist. The user may perform repeated operations (several click operations) by using the brush component in the second picture, and the first terminal may detect a plurality of trigger positions and the third coordinate data of each trigger position. In practical applications, when three or more trigger positions are detected, the first terminal may connect these trigger positions sequentially to form one closed candidate region and display it in the second picture for viewing by the user.

At step 23, the first terminal adjusts the third coordinate data of each vertex based on a size of the second picture to enable the adjusted first coordinate data to be within the predetermined range. With continuous reference to FIG. 3, the interactive interface further includes a store component 32. When detecting an operation for selecting the store component, the first terminal may process the third coordinate data in the set array pointlist into the first coordinate data and store the first coordinate data into a set array areapoints at a specified position. For example, the size of the second picture includes a width and a height. The first terminal may divide the abscissa in the third coordinate data by the width of the second picture and divide the ordinate in the third coordinate data by the height of the second picture, so as to scale the third coordinate data down to the first coordinate data.

At step 24, the first terminal records the first coordinate data of each vertex in a predetermined sequence to obtain the coordinate data of the recognition region, i.e. the initial position data, and store the initial position data into the set array areapoints. The above predetermined sequence may include clockwise or counterclockwise. For example, the first terminal may, with the center of the recognition region as a reference, record the first coordinate data of each vertex of the recognition region in a clockwise sequence, where the first coordinate data of all vertices of the recognition region can form the initial position data. Furthermore, the first terminal may store the above initial position data into the set array areapoints, and the initial position data in the set array areapoints may be uploaded as the first interactive instruction to the server.

It should be noted that the set array pointlist is a variable name with which the first terminal stores the third coordinate data and the set array areapoints is a variable name with which the first terminal stores the first coordinate data. In other words, the set array pointlist and the set array areapoints are used to respectively store the coordinate data before and after processing. In some embodiments, the above set array pointlist and the set array areapoints may be implemented by using a first-in-first-out queue such that the vertices of the recognition region can be easily stored in a predetermined sequence and easily read in a predetermined sequence, so as to achieve the effect of increasing the access efficiency.

In some embodiments, when detecting an operation for selecting the store component, the first terminal may display predetermined prompt information for prompting completion of configuration of the recognition region in the second picture. In some embodiments, the first terminal may display the predetermined prompt information of "region configuration completion" at the upper left corner of the second picture, and remind the user by a 3-second fade-out animation effect such that the user can determine that the matching process for the recognition region is completed, thereby improving the use experiences.

In some embodiments, the data structure of the initial position data includes:

"events": [{
  "eventName": "garbage overflow", // recognition function name, for example, garbage overflow;
  "areaType": 1, // recognition function type: 1: full graph configuration, 2: region configuration;
  "areaPoints": " " // the coordinate of each vertex of the recognition region, with the form of x,y,x,y•••, x and y are connected with a comma therebetween to form a character string; in a case of several recognition regions, a semicolon is present therebetween to separate them; in a case that the character string is null, it indicates full graph configuration; the values of x and y are within the predetermined range;
}
].

In combination with the coordinate structure of the set array areapoints in the above data structure, the third coordinate data is 52,133.25,581,81.25,754,298.25,42,324.25, namely, the abscissa of the first vertex is 52 and the ordinate of the first vertex is 133.25;
the abscissa of the second vertex is 581, and the ordinate of the second vertex is 81.25;
the abscissa of the third vertex is 754, and the ordinate of the third vertex is 298.25;
the abscissa of the fourth vertex is 42 and the ordinate of the fourth vertex is 324.25.

For example, the width and the height of the second picture are 800 and 450 respectively, which are measured in the unit of pixels. In this way, the converted first coordinate data is as follows:

0.065,0.2961111111111111,0.72625, 0.18055555555555555,0.9425,0.66277777 77777778, 0.0525,0.7205555555555555 namely, the abscissa of the first vertex is 0.065, and the ordinate of the first vertex is 0.2961111111111111;
the abscissa of the second vertex is 0.72625 and the ordinate of the second vertex is 0.18055555555555555;
the abscissa of the third vertex is 0.9425 and the ordinate of the third vertex is 0.6627777777777778;
the abscissa of the fourth vertex is 0.0525 and the ordinate of the fourth vertex is 0.7205555555555555.

In some embodiments, with continuous reference to FIG. 3, the interactive interface further includes an eraser component 33. When detecting an operation for selecting the eraser component 33, the first terminal may delete the set array pointlist and the set array areapoints to help reset the recognition region.

Figure 5:
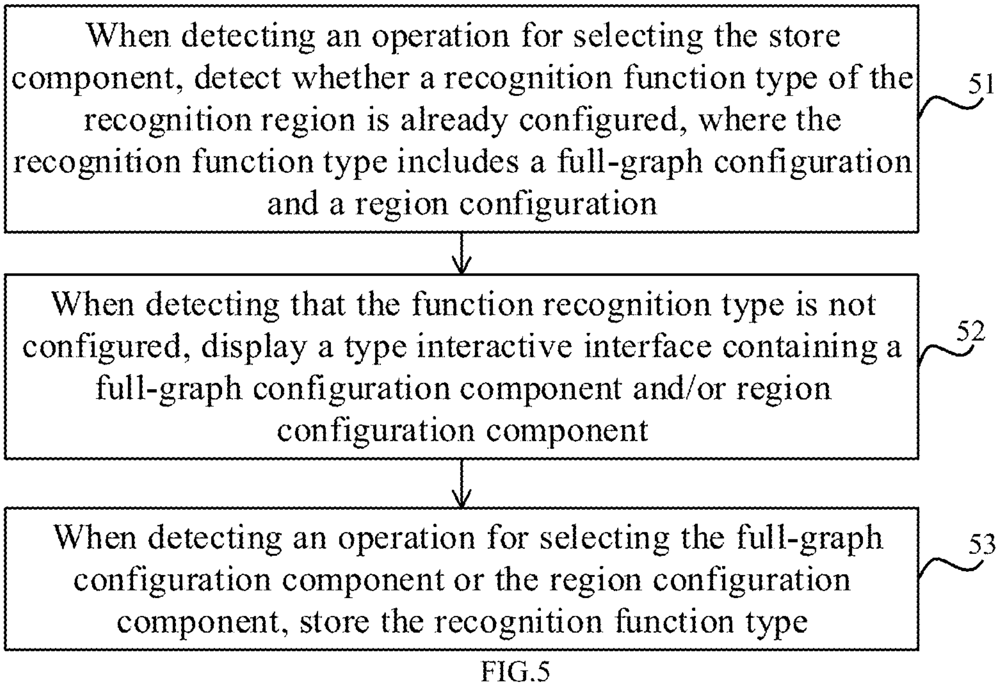
FIG. 5 is a flowchart of obtaining a recognition function type according to some embodiments of the present disclosure.

In some embodiments, in combination with the data structure of the initial position data, the first terminal may also carry out determination on the recognition function, which, as shown in FIG. 5, includes steps 51 to 53.

At step 51, when detecting an operation for selecting the store component, the first terminal detects whether a recognition function type of the recognition region is already configured, where the recognition function type includes a full-graph configuration and a region configuration. The full-graph configuration refers to that the recognition region occupies the whole second picture and the region configuration refers to that the recognition region occupies a part of the second picture.

At step 52, when detecting that the function recognition type is not configured, the first terminal displays a type interactive interface containing a full-graph configuration component and/or region configuration component.

At step 53, when detecting an operation for selecting the full-graph configuration component or the region configuration component, the first terminal stores the recognition function type. Thus, the setting of the recognition function type can guarantee the integrity of the data structure and help displaying the recognition region subsequently.

When a second terminal needs to display the above recognition region and an object, the second terminal may read the above initial position data from the server and obtain a size of its current picture, i.e. a first picture. It is considered that when the display contents of one terminal are transferred to another terminal for displaying, the display contents may be affected by the sizes of the two terminals or picture sizes. Thus, the second picture of the first terminal may be changed when transferred to the first picture of the second terminal.

Thus, the second terminal may obtain a first size of the first picture and a second size of the second picture and then obtain a ratio of the first size to the second size and then obtain the size of the first picture by multiplying the size of the second picture by the above ratio. In other words, when the size of the second terminal changes relative to the size of the first terminal where the user sets the recognition region, the first picture and the second picture both change pro rata and further the recognition regions also change pro rata, thereby avoiding the problem of failure to display the recognition region or deformation of the recognition region, and hence improving use experiences. Therefore, the recognition region can be set in any display device, and the above recognition region can be displayed on any display device of the system for interactively searching for a target object, eliminating the need of configuring the above recognition region on all display devices and improving the configuration efficiency.

For ease of calculation, if the size of the second picture is identical to the size of the first picture, the ratio of the size of the first picture to the size of the second picture is 1, namely, the width and the height of the first picture are 800 and 450 respectively which are measured in the unit of pixels.

It should be noted that, considering different configuration data for different terminals to display pictures, the second terminal may obtain the coordinate data, i.e. the initial position data, of the recognition region uploaded by the first terminal and based on a predetermined conversion rule, generate a corresponding shape. For example, the recognition region of the first terminal may be a rectangle whereas the recognition region of the second terminal may be a triangle, and thus the predetermined conversion rule may be that one minimum circumscribed triangle is generated based on the shape of the recognition region in the initial position data, and then taken as a recognition box of the second terminal. For another example, the recognition region of the first terminal may be a triangle whereas the recognition region of the second terminal may be a rectangle, and thus the predetermined conversion rule may be that one minimum circumscribed rectangle is generated based on the shape of the recognition region in the initial position data and then taken as a recognition box of the second terminal. In other words, after the initial position data is obtained, the initial position data may be firstly converted into target position data corresponding to the present terminal and the shape of the recognition region is obtained, and then based on the above shape, one minimum circumscribed shape is generated as the shape of the recognition region of the present terminal. It can be understood that the above predetermined conversion rule is only an example of conversion between different recognition region shapes, and those skilled in the arts can select a corresponding conversion rule based on specific scenarios, for example, select a minimum circumscribed circle or a minimum inscribed circle or the like, and hence, the corresponding solutions shall fall within the scope of protection of the present disclosure. It can be understood that in some embodiments, the recognition boxes of different terminals are allowed to have different shapes to meet the use requirements of different users, helping improve the use experiences. Alternatively, when a target object appears in different terminals, the recognition boxes of different terminals may mark the same target object to ensure the target object will not be lost, achieving the effect of tracking the object.

At step 12, a target object corresponding to the first interactive instruction is determined.

In some embodiments, after obtaining the first interactive instruction, the server may determine the target object corresponding to the first interactive instruction. The target object may include at least one of: a person, a vehicle, a recognition box of a recognition region, or any combination thereof. When the target object is a person, the target object may be represented by a feature vector of a position image containing the person; when the target object is a vehicle, the target object may be represented by a vehicle plate number of the vehicle or by a feature vector of a position image of a user searching for the vehicle; when the target object is a recognition box of a recognition region, the recognition box of the recognition region may include the above recognition box of rectangle, triangle and circle and the like.

Figure 6:
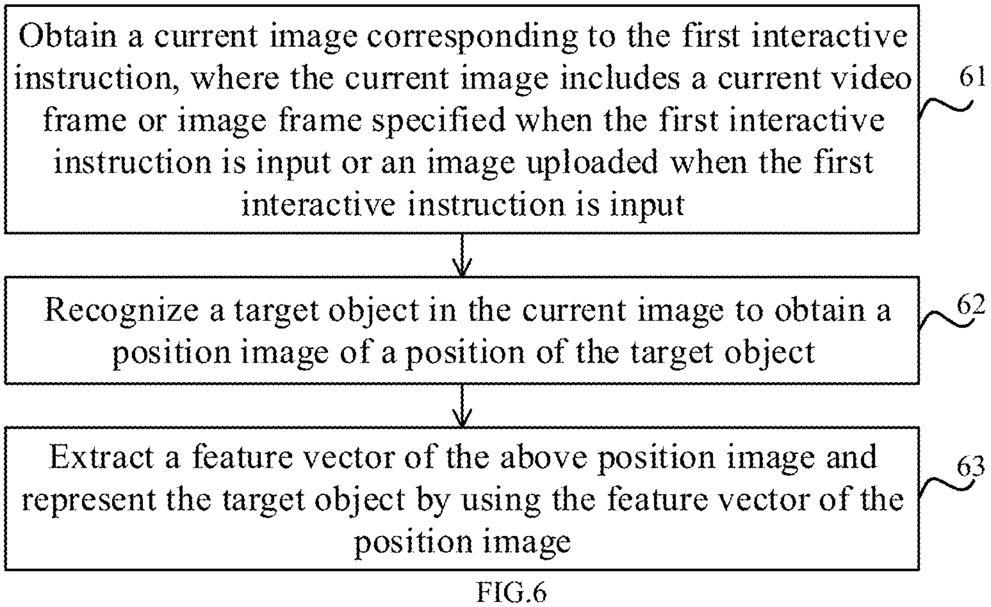
FIG. 6 is a flowchart of obtaining a target object according to some embodiments of the present disclosure.

In some embodiments, for example, with the target object as a person, when the first interactive instruction is the coordinate data of the recognition region, as shown in FIG. 6, at step 61, the server obtains an image displayed by the first terminal when sending the first interactive instruction, namely, obtains a current image corresponding to the first interactive instruction, where the current image includes a current video frame or image frame specified when the first interactive instruction is input or an image uploaded when the first interactive instruction is input. With the first terminal displaying a video stream, at step 62, the server recognizes a target object in the current image to obtain a position image of a position of the target object. At step 63, the server extracts a feature vector of the above position image and represents the target object by using the feature vector of the position image. The present disclosure may be applied to the scenarios where an image is uploaded or one image is displayed, helping improve the processing efficiency.

Figure 7:
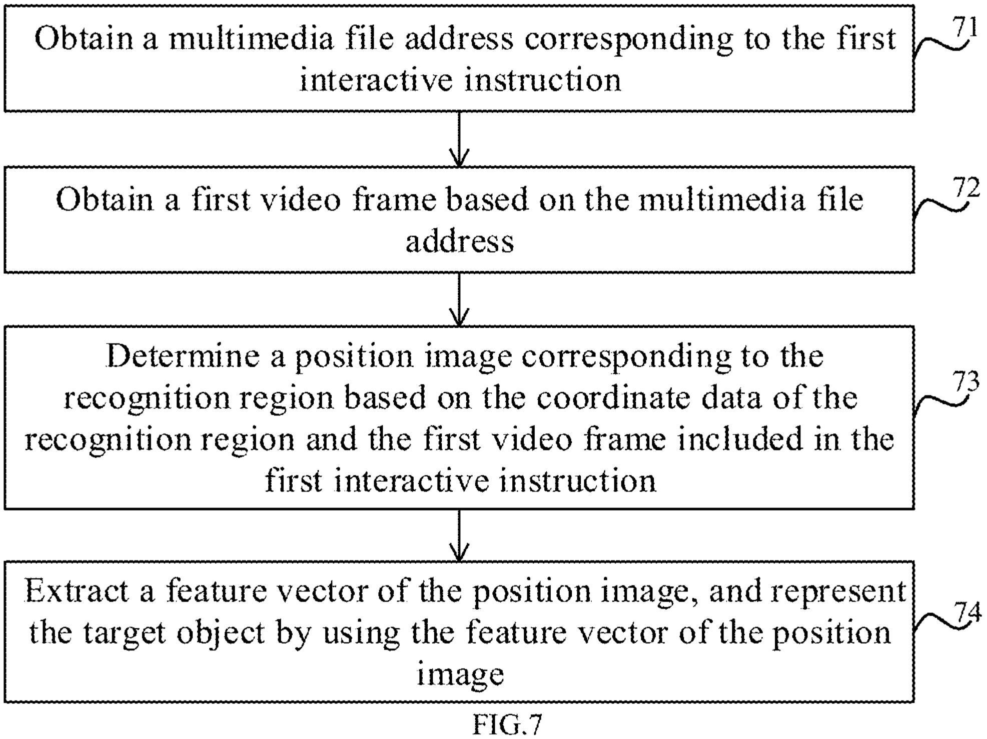
FIG. 7 is another flowchart of obtaining a target object according to some embodiments of the present disclosure.

In some embodiments, for example, with the target object being a person, when the first interactive instruction is the coordinate data of the recognition region, as shown in FIG. 7, at step 71, the server obtains a multimedia file address corresponding to the first interactive instruction, that is, in addition to uploading the coordinate data of the recognition region, the first terminal also uploads a multimedia file address as the contents of the first interactive instruction to the server. At step 72, the server obtains a first video frame based on the multimedia file address. At step 73, the server determines a position image corresponding to the recognition region, namely, the position image of the target object, based on the coordinate data of the recognition region and the first video frame included in the first interactive instruction. At step 74, the server extracts a feature vector of the position image, and represents the target object by using the feature vector of the position image. Since the multimedia file address can be transmitted faster than the image during the upload of the first interactive instruction, the processing efficiency can be improved.

In some embodiments, for example, with the target object as recognition box, when the first interactive instruction is the coordinate data of the recognition region, the server generates a recognition box based on the coordinate data of the recognition region and represents the target object by using the recognition box.

Considering that the coordinate data of the recognition region in the first interactive instruction may be stored in the same manner as the above initial position data, the server may, at this time, obtain the coordinate data of each vertex in the initial position data, for example, 0.065,0.29611111111111111,0.72625, 0.18055555555555555,0.9425,0.66277777 77777778, 0.0525,0.7205555555555555,

- the abscissa of the first vertex is 0.065, and the ordinate of the first vertex is 0.2961111111111111;
- the abscissa of the second vertex is 0.72625, and the ordinate of the second vertex is 0.18055555555555555;
- the abscissa of the third vertex is 0.9425, and the ordinate of the third vertex is 0.6627777777777778;
- the abscissa of the fourth vertex is 0.0525, and the ordinate of the fourth vertex is 0.7205555555555555.

Then, the sever obtains may obtain a size of the first picture, where the first picture may be a picture displayed by the first terminal or a picture displayed by the second terminal. Furthermore, the server may obtain target coordinate data of each vertex in the first picture by multiplying the abscissa of the each vertex by the width of the size of the first picture and multiplying the ordinate of each vertex by the height of the size of the first picture.

For example, with the first picture and the second picture being same in size, it is assumed that the width and the height of the second picture are 800 and 450 respectively, which are measured in the unit of pixels. Thus, after obtaining the second coordinate data of each vertex in the first picture, the server may obtain the target coordinate data, namely, the second coordinate data of each vertex of the recognition region in the first picture is same as third coordinate data in the second picture, and thus the second coordinate data in the target coordinate data is obtained as follows: 52,133.25,581,81.25,754,298.25,42,324.25;

the abscissa of the first vertex is 52 and the ordinate of the first vertex is 133.25;

the abscissa of the second vertex is 581 and the ordinate of the second vertex is 81.25;

the abscissa of the third vertex is 754 and the ordinate of the third vertex is 298.25;

the abscissa of the fourth vertex is 42 and the ordinate of the fourth vertex is 324.25.

It is assumed that the width and the height of the second picture are 800 and 450 respectively, which are measured in the unit of pixels. After the second coordinate data of the each vertex in the first picture is obtained, the target coordinate data can be obtained.

In some embodiments, after the recognition region is displayed in the first picture, a background color of the recognition region may be further adjusted to a target color, for example, green or red the like. With the recognition region as forbidden region, the background color may be adjusted to red at this time; with the recognition region as open region, the background color may be adjusted to green at this time. By adjusting the background color the recognition region, the recognizability of the recognition region can be increased.

In some embodiments, when the first interactive instruction is user data obtained by code scanning, the server may determine a target object based on the user data. For example, based on a vehicle plate number in the user data and a parking position of the vehicle corresponding to a vehicle number in the historical data, a parking position of the vehicle can be determined, and a recognition box is generated at the parking position of the vehicle. Alternatively, the server may obtain a current position of the first terminal and then generate a recognition box corresponding to the current position on a map and represent the target object by using the recognition box.

It is noted that in a person-searching scenario, the user usually searches for a target object based on a picture of the first terminal; at this time, the target object may appear within a coverage scope of the second terminal, and thus a picture collected by the second terminal may be synchronized to the first terminal for displaying. For the target object and the user (monitoring person), the user may be considered to be in stationary state while the target object may be considered to be in a movement state, and the movement direction of the target object to the user is random. In a vehicle-searching scenario, in the present disclosure, the vehicle may be considered as a user in a person-searching scenario and the driver may be considered as a target object in the person-searching scenario; the movement direction of the target object is moving toward the vehicle. Based on the essence of the above idea, the movement of the driver and the stationariness of the vehicle are relative to each other and thus, the movement of the driver may be converted into relative movement of the vehicle, that is, the driver itself moves but is considered as stationary whereas the vehicle itself is stationary but is considered as moving. In other words, in the present disclosure, the person-searching scenario and the vehicle-searching scenario belong to a same idea, and hence, the target object (to-be-searched person or driver) can be searched for based on the person-searching idea.

At step 13, target information of the target object is obtained, where the target information includes at least one of: a feature vector of the position image, a current position of the target object, picture information of the current position, a historical trajectory of the target object, a navigation route, or any combination thereof.

In some embodiments, the server may obtain the target information of the target object.

Figure 8:
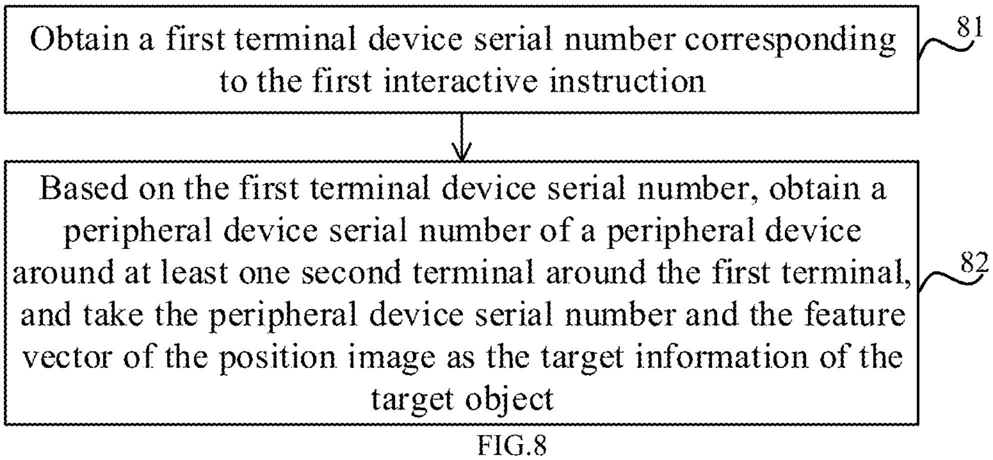
FIG. 8 is a flowchart of obtaining target information according to some embodiments of the present disclosure.

In some embodiments, the target information may be a feature vector of the position image. As shown in FIG. 8, at step 81, the server obtains a first terminal device serial number corresponding to the first interactive instruction. At step 82, the server, based on the first terminal device serial number, obtains a peripheral device serial number of a peripheral device around at least one second terminal around the first terminal, and takes the peripheral device serial number and the feature vector of the position image as the target information of the target object. In some embodiments, the server may send the above feature vector and peripheral device serial number to a specified storage zone, where the specified storage zone includes: a message queue, an object database, or both. The server stores, in advance, the serial number of the second terminal, the physical position of each terminal, and a serial number of a terminal around each terminal and the like. Based on the above information, a first mapping relationship between first terminal and second terminal may be generated.

It should be noted that in a person-searching scenario, the above first terminal is used to display a picture of the second terminal containing the target object, and thus, the first terminal actually is the second terminal containing the above target object. In a vehicle-searching scenario, the above first terminal is also used to display a picture of the second terminal (e.g. a vertical screen or a camera) containing the target object and the position of the first terminal is represented by using the position of the second terminal, and thus the first terminal actually is the second terminal containing the above target object.

In other words, the above first mapping relationship may be understood as a second mapping relationship between first terminal and second terminal. Thus, the server may store, in advance, the second mapping relationship between first terminal and second terminal, where the second mapping relationship may include a first terminal device serial number, a second terminal device serial number, a physical position of each terminal, and a serial number of a terminal around each terminal and the like. Those skilled in the art may set the contents of the second mapping relationship based on specific scenarios and the corresponding solutions fall within the scope of protection of the present disclosure. By obtaining the peripheral device serial number of a peripheral device around at least one second terminal around the first terminal, a source for obtaining other data subsequently can be determined, helping increase the data processing efficiency.

Figure 9:
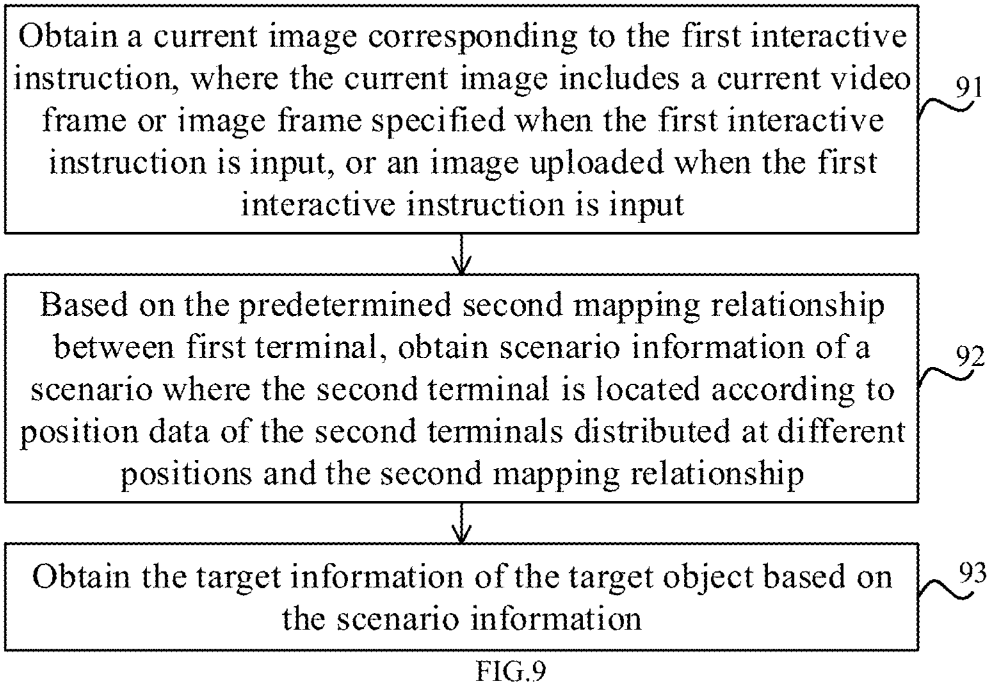
FIG. 9 is another flowchart of obtaining target information according to some embodiments of the present disclosure.

In some embodiments, as shown in FIG. 9, at step 91, the server obtains a current image corresponding to the first interactive instruction, where the current image includes a current video frame or image frame specified when the first interactive instruction is input, or an image uploaded when the first interactive instruction is input. At step 92, based on the predetermined second mapping relationship between first terminal and second terminal, the server obtains scenario information of a scenario where the second terminal is located according to position data of the second terminals distributed at different positions and the second mapping relationship. The scenario information includes: an image collected by the second terminal, a scenario element, or both; where the scenario element includes: a second terminal device serial number, a peripheral device serial number of a peripheral device around the second terminal, or both. At step 93, the server obtains the target information of the target object based on the scenario information.

In some embodiments, the scenario information includes picture information, and based on the position data of the second terminals distributed at different positions and the second mapping relationship, obtaining, by the server, the scenario information of the scenario of the second terminal includes: obtaining, by the server, a feature vector of the current image corresponding to the first interactive instruction; then, obtaining, by the server, candidate feature vectors matching the feature vector of the current image in the object database to obtain a target feature vector, where the object database includes candidate feature vectors corresponding to the picture information uploaded by the second terminal in the second mapping relationship with the first terminal; then, obtaining, by the server, picture information corresponding to the target feature vector and taking the picture information as the scenario information. In this case, it is only required to determine the target feature vector in the candidate feature vectors in the second mapping relationship with the first terminal, thus improving the efficiency of obtaining the scenario information.

In some embodiments, in a process of obtaining the target feature vector, the server may update the object database, where the object database includes several candidate feature vectors. For example, when the object database includes a first database, the server may obtain a current image where the target object is located, where the current image is a first image of a current stream address corresponding to the first interactive instruction; recognize a second number of objects in the first image to obtain a second number of position images; respectively extract a feature of each position image to obtain a second number of feature vectors; update the second number of feature vectors to the first database and obtain feature vector identifiers (ID). For another example, when the object database includes a second database, the server may store the second number of position images into the second database and obtain an accessible Uniform Resource Locator (URL) address of each position image returned by the second database and a feature vector ID generated when the feature vector of each position image is updated to the first database; based on the feature vector ID and the URL address, generate a second number of pieces of data and store the second number of pieces of data into the second database. Therefore, the server can obtain a position image in the second database once obtaining a feature vector ID to achieve one-to-one matching effect of feature vector and position image. Then, the server may match the feature vector of the target object with the candidate feature vectors in the object database to obtain a first number of candidate feature vectors. Then, the server may obtain a candidate feature vector with maximum similarity as the target feature vector from the first number of candidate feature vectors.

Figure 10:
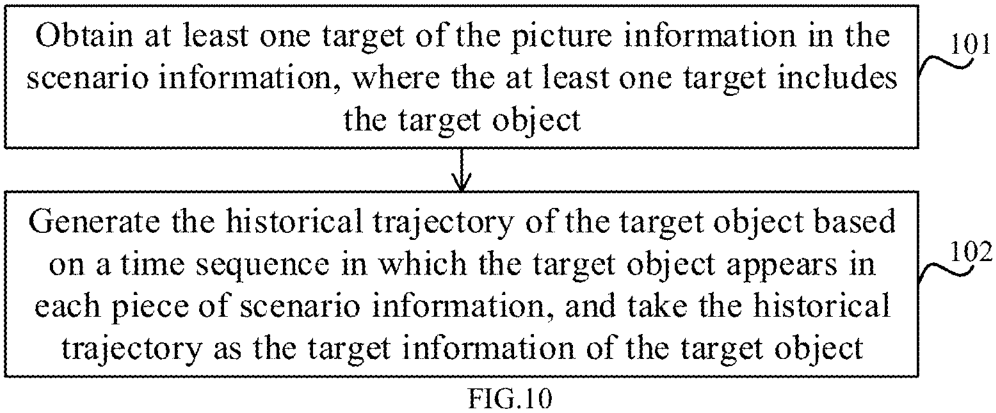
FIG. 10 is another flowchart of obtaining target information according to some embodiments of the present disclosure.

In some embodiments, for example, with the target information as the historical trajectory of the target object, as shown in FIG. 10, at step 93, the server obtains the historical trajectory of the target object based on the scenario information, which includes steps 101 to 102. At step 101, the server obtains at least one target of the picture information in the scenario information, where the at least one target includes the target object. At step 102, the server generates the historical trajectory of the target object based on a time sequence in which the target object appears in each piece of scenario information, and takes the historical trajectory as the target information of the target object. Thus, by obtaining the historical trajectory of the target object, the target object can be tracked, which is applicable to a person-searching scenario.

It can be understood that at step 102, when sorting the time that the target object appears in each piece of scenario information, the server obtains one piece of scenario information closest to a current time; the server obtains a position of the second terminal corresponding to this scenario information, and takes the position of the second terminal as a current position of the target object and hence the server takes the current position of the target object as the target information of the target object.

Figure 11:
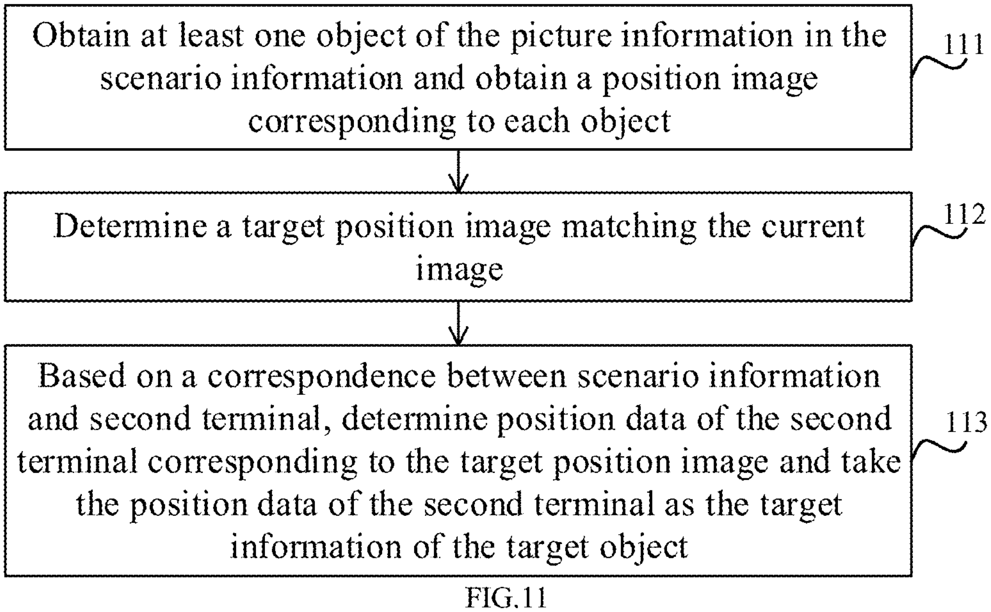
FIG. 11 is another flowchart of obtaining target information according to some embodiments of the present disclosure.

In some embodiments, for example, with the target information as picture information of the target object, as shown in FIG. 11, the step 93 of obtaining, by the server, the target information of the target object based on the scenario information includes steps 111 to 113.

At step 111, the server obtains at least one object of the picture information in the scenario information and obtains a position image corresponding to each object. At step 112, the server determines a target position image matching the current image. The second terminal may upload the collected image or video frame to the server. The server may adjust the image or video frame uploaded by the second terminal, obtain at least one object of each image or video frame and obtain the position image corresponding to each object. Then, the server may extract a feature vector of each position image and store it into the first database of the object database as candidate feature vector. The server may obtain the feature vector of the current image and match the feature vector of the current image with the candidate feature vectors in the first database of the object database, for example, calculate a similarity of two feature vectors; then, sort the similarities and take a candidate feature vector corresponding to maximum similarity as the target feature vector and take the position image corresponding to the target feature vector as the target position image. At step 113, the server, based on a correspondence between scenario information and second terminal, determines position data of the second terminal corresponding to the target position image and takes the position data of the second terminal as the target information of the target object, so as to obtain the real-time position of the target object.

Figure 12:
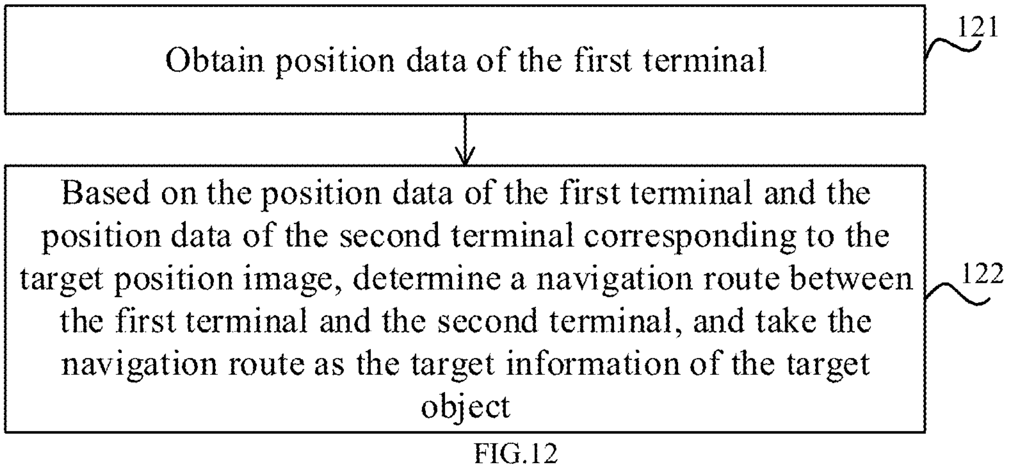
FIG. 12 is another flowchart of obtaining target information according to some embodiments of the present disclosure.

In some embodiments, for example, with the target information as the navigation route, as shown in FIG. 12, the step 93 of obtaining, by the server, the navigation route based on the scenario information includes steps 121 to 122. At step 121, the server obtains position data of the first terminal, where the position data of the first terminal may be uploaded to the server by communication between the first terminal and the second terminal (e.g. vertical screen) and thus the server obtains the position data of the first terminal. Alternatively, the first terminal communicates with a reference signal source to obtain the position data of the first terminal, for example, the server may obtain the position data of at least three reference signal sources close to the first terminal, where the reference signal sources are pre-set at known positions. In some embodiments, the server may obtain signal strengths of the reference signals received by the first terminal from the reference signal sources and then sort the signal strengths and select the reference signal sources corresponding to at least three signal strengths based on a descending order and obtain the position data of the at least three reference signal sources. In some embodiments, the server obtains a distance between the first terminal and each of the at least three reference signal sources, and based on the position data of the at least three reference signal sources and the corresponding distances, calculates coordinate data of the first terminal to obtain the position data of the first terminal. In some embodiments, the server may calculate the position data of the first terminal based on a predetermined weighted centroid algorithm. With the position data of three reference signal sources as an example, the formula of the weighted centroid algorithm is as follows:

$$x_b = \frac{\frac{x_1}{d_1} + \frac{x_2}{d_2} + \frac{x_3}{d_3}}{\frac{1}{d_1} + \frac{1}{d_2} + \frac{1}{d_3}}$$

$$y_b = \frac{\frac{y_1}{d_1} + \frac{y_2}{d_2} + \frac{y_3}{d_3}}{\frac{1}{d_1} + \frac{1}{d_2} + \frac{1}{d_3}}$$

where $x_b$, $y_b$ refer to an abscissa and an ordinate of the position of the first terminal respectively, $x_1$, $x_2$, $x_3$ refer to abscissas of the first reference signal source, the second reference signal source and the third reference signal source respectively, $y_1$, $y_2$, $y_3$ refer to ordinates of the first reference signal source, the second reference signal source and the third reference signal source respectively, $d_1$, $d_2$, $d_3$ refer to distances between the first terminal and the first reference signal source, the second reference signal source and the third reference signal source respectively.

Thus, the server may, based on the position data of the at least three reference signal sources, determine the position data of the first terminal itself. It should be noted that the reference signal sources may be signal sources individually disposed for positioning (e.g. Bluetooth signal transmitter), or the first terminal is determined by using the second terminal with known position information, which is based on similar positioning principle and will not be repeated herein. It is further noted that when the navigation route is obtained, the position information of the first terminal is the actual position of the first terminal itself; when the first terminal displays a picture coming from the second terminal, it is required to switch to a picture of a particular second terminal and the position information of the first terminal is an equivalent position which is the position of the second terminal corresponding to the currently-displayed picture. The specific meaning of the position information of the first terminal may be analyzed based on specific scenarios.

At step 122, the server, based on the position data of the first terminal and the position data of the second terminal corresponding to the target position image, determines a navigation route between the first terminal and the second terminal, and takes the navigation route as the target information of the target object. Thus, by obtaining the navigation route, the user can accurately obtain the target object in a case of holding the first terminal, improving the searching efficiency.

Figure 13:
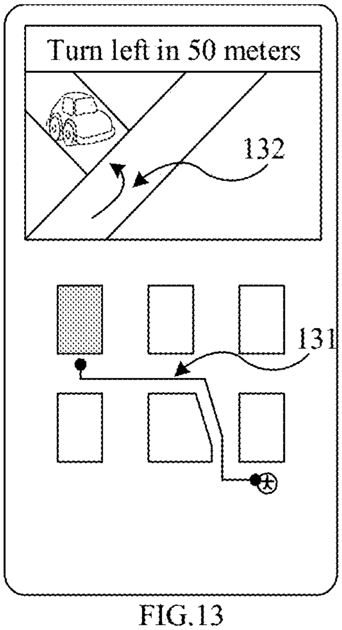
FIG. 13 is an effect diagram of displaying a navigation route and a navigation identifier according to some embodiments of the present disclosure.

In some embodiments, the target information may further include a navigation identifier used to assist the user in determining a movement route and a movement direction. The server may, based on an orientation of the first terminal and the navigation route, generate a navigation identifier and take the navigation identifier as the target information of the target object. As shown in FIG. 13, the navigation route 131 shows a suggested route between the initial position and the position of the target object. The navigation route may be a route with a shortest trip or with least time or with a smallest number of times of turning left or with fewest traffic lights, which may be selected based on specific scenarios. The navigation identifier 132 shows an orientation with which the first terminal moves toward the position of the target object from the current position, for example, go straight, turn left or turn right or the like, such that the user can be always on the navigation route, achieving the matching effect of the navigation route and the search route, and helping improve the searching efficiency.

In some embodiments, when the scenario information includes picture information, the step 93 of obtaining, by the server, the target information of the target object based on the scenario information includes: obtaining, by the server, the picture information of the second terminal closest to the first terminal and taking the picture information as the target information of the target object. For example, during a movement process, the first terminal may establish communication with the second terminal through Bluetooth or wireless network communication technology (WiFi) and take the closest second terminal as the current position of the first terminal and take the picture information uploaded by the second terminal as the target information of the target object, namely, take the picture information of the second terminal as the target information of the target object. Thus, the first terminal can persistently display the picture information of the closest second terminal, helping the user to find the target object in time.

In some embodiments, the server may send the picture information of two or more second terminals which are close to each other to the first terminal such that the first terminal can display multiple pieces of picture information by split screen. When displaying multiple pieces of picture information, the first terminal may detect an operation that the user clicks on a picture and display this picture separately. Of course, the first terminal may also detect a user return operation to restore the displaying of the multiple pieces of picture information. By displaying a particular picture or multiple pictures, the user can conveniently view each of the pictures so as to quickly find the target object.

In some embodiments, the server may send recognition code information (e.g. MAC address, and serial number or name of the second terminal) of the second terminal close to the first terminal to the first terminal, such that the first terminal can establish bluetooth connection or WiFi connection or another wireless connection with the second terminal based on the above recognition code information, and receive picture information of the second terminal through the wireless connection, so as to reduce the data transmission pressure of the server.

In some embodiments, the target information may further include target sub-map data which may include: map data, map recognition code, or both. The map data refers to a map image that can be directly used, and the map recognition code refers to a recognition code of a map image. When no map data is stored in the first terminal, the target sub-map data may be the map data such that less storage resources in the first terminal can be occupied. When the map data is downloaded in advance in the first terminal, the target sub-map data may be a map recognition code and thus, the first terminal can obtain local map data when obtaining the map recognition code and further obtain a target sub-map, such that the data transmission amount between the first terminal and the server can be reduced, thereby improving the communication efficiency. The server can obtain the picture information of the second terminal closest to the first terminal, and then based on the picture information, obtain target sub-map data of a place where the second terminal is located, and take the target sub-map data as the target information of the target object. In some embodiments, the server may obtain a feature vector of the picture information.

For example, the server may, based on a predetermined recognition algorithm, recognize the picture information of the second terminal to obtain a feature vector of the picture information or, determine multiple feature points (e.g. texture, corner and identifier information and the like) in the above picture information and based on the feature point data, generate a feature vector. Then, the server may match the feature vector of the picture information with the feature vectors in a predetermined visual sub-map database, for example, calculate a similarity between two feature vectors, so as to obtain a feature vector with maximum similarity. Then, the server may obtain the sub-map data corresponding to the feature vector with maximum similarity and thus obtain the target sub-map data. Therefore, by providing the target sub-map data, the accurate target information can be provided such that the user can conveniently determine the position and the search route of the target object, reducing the difficulty of searching for the target object and further improving the searching efficiency.

Figure 14:
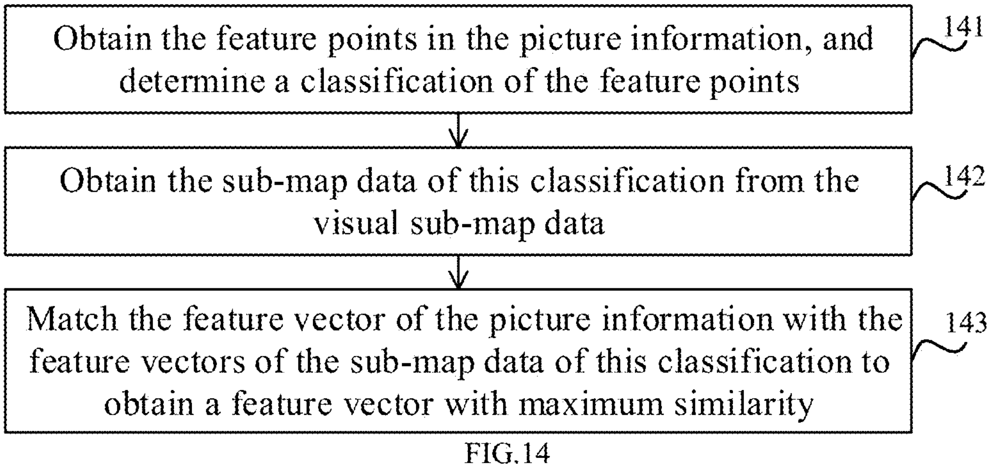
FIG. 14 is a flowchart of obtaining a feature vector according to some embodiments of the present disclosure.

In practical applications, much sub-map data is stored in the visual sub-map database, which may increase a search time. For this reason, in some embodiments, a classification option may be added to the sub-maps in the visual sub-map database, where the classification option includes but not limited to: roof, ground, column, corner, parking space serial number, and identifier shape (e.g. triangle, rhombus, square, and trapezoid and the like) and the like. Based on the above classification option, the sub-maps in the visual sub-map database can be divided into multiple classes. As shown in FIG. 14, at step 141, the server obtains the feature points in the picture information, and determines a classification of the feature points. At step 142, the server obtains the sub-map data of this classification from the visual sub-map data. At step 143, the server matches the feature vector of the picture information with the feature vectors of the sub-map data of this classification to obtain a feature vector with maximum similarity. Thus, the matching process is performed on the sub-map data of one classification or some classifications rather than on all sub-map data, which reduces the matching data volume and increases the efficiency of obtaining the target sub-map, and hence can be applied to scenarios with high real-time requirements.

In some embodiments, the target information may be the coordinate data of the recognition region. Obtaining, by the server, the target information of the target object may include: determining, by the server, a recognition region corresponding to the first interactive instruction; then, obtaining, by the server, the coordinate data of the recognition region, and taking the coordinate data of the recognition region as the target information of the target object. It should be understood that the above recognition region may be a region formed when the user delimits a recognition box in a picture or a region of the target object recognized in the image uploaded by the second terminal, and hence, it is defaulted that the target object is within the recognition region. Based on the coordinate data of the recognition region, the recognition region or recognition box is generated to indicate the target object, helping the user to find the target object in time.

It should be noted that, considering that it is possible that the recognition box is displayed in the picture of the first terminal or the second terminal based on the coordinate data of the recognition region subsequently, the server may process the coordinate data of the above recognition region as initial position data. For example, the server may obtain the third coordinate data of each vertex of the recognition region, and then, based on the size of the picture in the first terminal, adjust the third coordinate data of each vertex to obtain the first coordinate data, where the first coordinate data is within a predetermined rang; afterwards, based on a predetermined sequence, record the first coordinate data of each vertex to obtain the position data of the recognition region. It can be understood that the specific contents of the initial position data can be referred to the contents shown in FIG. 2 and will not be repeated herein.

At step 14, the target information is sent to the first terminal such that the first terminal displays the target information.

Figure 15:
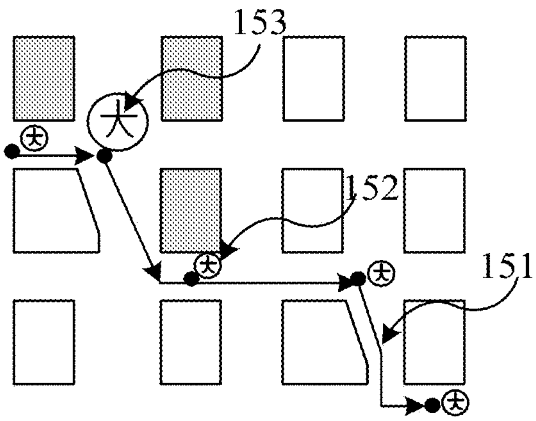
FIG. 15 is an effect diagram of displaying a historical trajectory and a position image according to some embodiments of the present disclosure.
Figure 16:
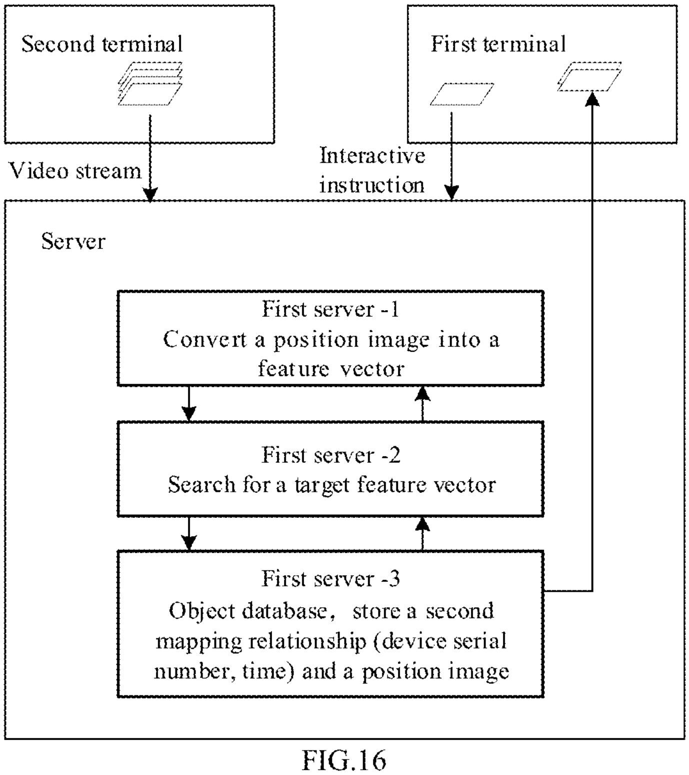
FIG. 16 is a block diagram illustrating a system for interactively searching for a target object according to some embodiments of the present disclosure.

In some embodiments, the server may send the target information directly to the first terminal, such that the first terminal displays the above target information. Alternatively, the server may, based on the target information, process a multimedia file of the second terminal, for example, superimpose at least one of the recognition box, the historical trajectory, the navigation route, the current position, or the position image in the target information onto the video frame of the second terminal, so as to obtain a target multimedia file containing the target information. The server may push the target multimedia file to the first terminal. The display effect of the above target multimedia file played by the first terminal is as shown in FIG. 15. With reference to FIG. 15, the numeral 151 refers to the historical trajectory of the target object, and the numeral 152 refers to the position image and the historical position of the target object, and the numeral 153 refers to the position image and the current position of the target object.

In some embodiments, the target information includes a recognition box. Namely, regardless of the fact that the target object is the picture of any second terminal during a movement process, the target object can be marked in the picture of the first terminal, such that the user can instantaneously find the target object in the picture without losing the tracked object, thus improving the use efficiency.

Since the coverage scope of the camera in the first terminal and the second terminal is limited, the target object may move out of the coverage scope of one terminal. For this reason, in some embodiments, the server may also detect whether the target object is out of the picture of the first terminal, that is, detect whether the target object leaves the coverage scope of one terminal. When detecting that the target object is out of the picture of the first terminal, the server may obtain a peripheral device serial number of a peripheral device around at least one second terminal around the first terminal and a feature vector of the target object, and then, based on the peripheral device serial number and the feature vector of the target object, re-obtain the information of the target object. Namely, with the peripheral device serial number of a peripheral device around at least one second terminal around the first terminal and the feature vector of the target object as the target object, the steps 12 to 14 are continued until a second terminal covering the target object is found; then, the picture information of the second terminal is fed back to the first terminal for displaying and at the same time, the target information of the target object is superimposed to generate the above target multimedia file. Thus, by switching the picture information of different second terminals to the first terminal, the effect of searching for the object across camera is achieved, improving the searching efficiency.

Since in some scenarios such as a person-searching scenario or a vehicle-searching scenario in an urban commanding system, one first terminal is not sufficient to satisfy the requirements of the actual scenarios, and thus, a plurality of first terminals may be disposed, where one of the plurality of first terminals serve as a primary terminal and others serve as secondary terminals. In this case, the server may send the target information to each of the first terminals, for example, firstly send the target information to the primary terminal of the first terminals and then based on a mapping relationship between primary terminal and secondary terminal, send the target information to each of the secondary terminals. In this way, the same target information can be displayed synchronously on the plurality of first terminals and the display requirements of a plurality of first terminals, especially the first terminals in different spaces are satisfied. In some embodiments, in a case of a plurality of first terminals, the terminals may be grouped and each group may display a part of the picture displayed by the primary terminal. For example, the first terminal may display a combination of 16 pictures, whereas four secondary terminals may display 4 of the 16 pictures respectively. Thus, it is guaranteed that a plurality of first terminals can collectively display some of the pictures, and the primary terminal can globally display all pictures. For example, in the urban commanding system, the first terminals in a provincial capital center and the first terminals in a prefecture-level city center can synchronously display at least some same contents, so as to improve the monitoring efficiency or use experiences. For another example, in a vehicle-following scenario, a vehicle ahead searches for a parking space in a parking lot while a vehicle behind can synchronize the picture in the camera of the vehicle ahead, increasing the observation view of field.

In some embodiments, the position information of the first terminal may be selected based on scenarios, for example, it is defaulted to use the position information of the primary terminal to represent the position of all first terminals. For another example, based on an operation on the primary terminal, the position information of the primary terminal or one secondary terminal may be selected to represent the position of all first terminals, such that the primary terminal operates one secondary terminal for task assignment, and the navigation route is generated based on the position of one secondary terminal and the like, helping expand the use scenarios and improve the use experiences.

It is considered that the user may cancel searching for a target object after finding the target object. Therefore, in some embodiments, the user may input a second interactive instruction on the interactive interface of the first terminal, for example, click a button for cancelling searching for person or cancelling searching for vehicle and send the second interactive instruction to the server. When detecting the second interactive instruction from the first terminal, the server stops obtaining the target information of the target object. For example, the server may obtain a peripheral device serial number of a peripheral device around a second terminal bound to the first terminal and restore the multimedia file of the second terminal corresponding to the peripheral device serial number to an original multimedia file and clear the corresponding stored data, for example, the feature vector or target information of the target object or the like. Thus, search for the target object can be stopped and the search experiences can be improved.

In the solutions provided by the present disclosure, a first interactive instruction is obtained from the first terminal; then, a target object corresponding to the first interactive instruction is determined; then, target information of the target object is determined, where the target information includes at least one of: a current position of the target object, picture information of the current position, a historical trajectory of the target object, a navigation route, or any combination thereof; finally, the target information is sent to the first terminal such that the first terminal displays the target information. By obtaining the target information of the target object and displaying the target information, the user can be helped to search for the target object, helping increase the searching efficiency and use experiences.

A system for interactively searching for a target object is deployed below in combination with a person-searching scenario and the above method of interactively searching for the target object. As shown in FIGS. 16 to 19, the system includes:

a real-time video display module A, a stream media service module, a video service processing module C, an artificial intelligence (AI) algorithm data receiving service module D, a message queue module E, and a camera real-time video stream module F. The real-time video display module A is deployed on the first terminal, the camera real-time video stream module F is deployed on the second terminal and other modules are deployed on the server. It can be understood that the expressions of the first terminal and the second terminal are used to highlight different functions of the first terminal and the second terminal at a moment, for example, the first terminal is used to provide the feedback of target information to the user whereas the second terminal is used to collect a video stream and upload it to the server. In practical applications, for a terminal, it can serve as the first terminal and/or the second terminal. Further, each first terminal and/or second terminal carries its own serial number and at least one peripheral device serial number around, namely, the server stores a second mapping relationship between first terminal and second terminal.

In some embodiments, the real-time video display module A is used to acquire a stream media video stream, and the stream media service module is used to collect and upload a video real-time stream. The video service processing module C is deployed with multiple video stream services to acquire the video real-time stream uploaded by the stream media service module and send a processing result to a stream media server, i.e. the stream media service module. The video service processing module C is further deployed with a service used to monitor the message queue module E. The AI algorithm data receiving service module D is used to provide an http interface.

Figure 17:
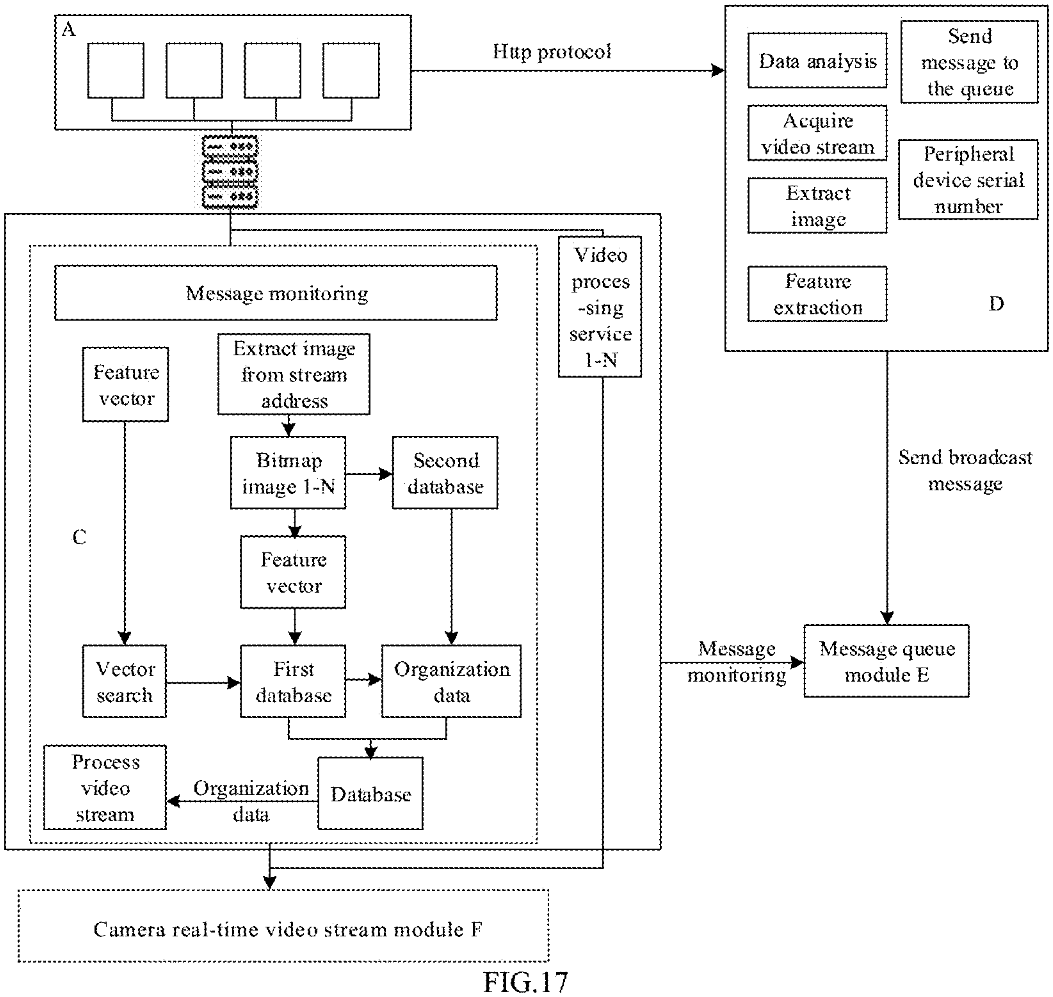
FIG. 17 is a block diagram illustrating another system for interactively searching for a target object according to some embodiments of the present disclosure.

As shown in FIG. 17, the work flow of the system includes the following flows.

System Flow I

1. When the first terminal displays a picture, the user may set a recognition region on any one picture of the real-time video display module A to generate a recognition box, and use the recognition box to enclose a to-be-searched object (e.g. person), namely, enable the target object to be within the recognition region. At this time, the first terminal may obtain coordinate data of the recognition region.
2. The real-time video display module A may send the coordinate data of the recognition region, a video stream address, a first terminal device serial number as a first interactive instruction to the AI algorithm data receiving service module D in the server. In practical applications, the coordinate data of the recognition region, the video stream address, the first terminal device serial number can be processed as data of Json format, helping transmission and analysis, and further increasing the transmission efficiency.
3. The AI algorithm data receiving service module D in the server can analyze the above first interactive instruction to obtain the coordinate data of the recognition region, the video stream address, and the first terminal device serial number; and based on the coordinate data of the recognition region, the video stream address, and the first terminal device serial number, perform the following operations:

3.1 The AI algorithm data receiving service module D provides a first image based on the video stream address.

3.2 The AI algorithm data receiving service module D extracts the position image of the target object based on the coordinate data of the recognition region and the above first image.

3.3 The AI algorithm data receiving service module D extracts a feature of the position image of the target object to obtain a feature vector.

3.4 The AI algorithm data receiving service module D obtains a peripheral device serial number based on the first terminal device serial number and a predetermined second mapping relationship.

3.5 The AI algorithm data receiving service module D sends the feature vector and the peripheral device serial number to the message queue and broadcasts the message.

4. The video service processing module C in the server includes that the video processing service of each terminal can receive the above broadcast message (i.e. the feature vector and the peripheral device serial number), and can perform the following operations.

4.1 The video processing service detects whether the peripheral device serial numbers include its own device serial number; and if the peripheral device serial numbers do not include its own device serial number, discards the message; if the peripheral device serial numbers include its own device serial number, performs step 4.2.

4.2 The video processing service extracts the first image from the current stream address; extracts the position image of at least one person from the first image and obtains the data corresponding to each position image, which includes the followings:

4.2.1 extracting a feature of the position image of each person, and obtaining a feature vector of each position image;

4.2.2 storing at least one feature vector into the first database of the object database and generating a feature vector ID of each feature vector, where the feature vector ID is a string type character string;

4.2.3 storing the position image of each person into the second database, for example, Object Storage Service (OSS) device of the object database, and generating an accessible URL address for each position image;

4.2.4 processing the feature vector ID and the URL address to obtain the data corresponding to each position image and storing the data into the object server.

4.3 The video processing service may match the feature vector in the broadcast message with the feature vectors in the first database of the object database to obtain m matching results sorted based on distance and returned by the first database. The distance is between [0, 1], and the larger distance means the feature vector in the broadcast message is more similar to the feature vector in the first database. In some embodiments, the above distance is represented by a cosine value. In some embodiments, one distance threshold may be set such that matching results exceeding the distance threshold can be selected. When a matching result with the distance exceeding the distance threshold is present, the following operations are performed:

4.3.1 setting a recognition box at the position of the result with maximum similarity, processing the original video stream and returning a video stream with the recognition box, which means the target video stream carries the target information;

4.3.2 pushing the target video stream to the stream media server, i.e. the stream media service module;

4.3.3 acquiring, by the real-time video display module A, the target video stream from the stream media server and displaying the above target video stream;

4.3.4 storing the feature vector in the broadcast message for use in later flow.

5. Flow end

System Flow II

When the first terminal displays a picture of one second terminal, if the target object is out of the picture of the first terminal, namely, leaves the coverage scope of the second terminal, the video processing service corresponding to the second terminal completes the following operations:

1. Based on the device serial number of the second terminal and the second mapping relationship, a peripheral device serial number of a peripheral around the second terminal is obtained.
2. The feature vector of the target object, i.e. the feature vector stored at step 4.3.4 in system flow I, is obtained.
3. The feature vector and the peripheral device serial number are sent to the message queue and message broadcast is performed.
4. Step 4 and subsequent steps in the system flow I are performed.

System Flow III

Figure 18:
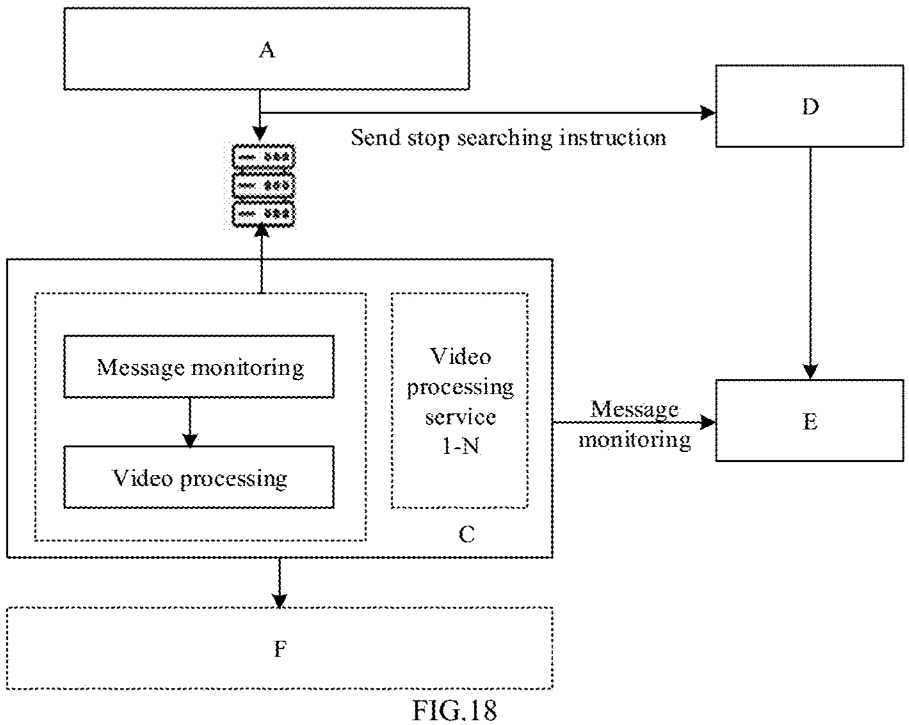
FIG. 18 is a block diagram illustrating another system for interactively searching for a target object according to some embodiments of the present disclosure.

When there is no need to search for a target object, as shown in FIG. 18, the system performs the following operations.

1. The user may click on a button for cancelling search on the first terminal. The real-time video display module A may send a second interactive instruction for cancelling searching for the target object to the AI algorithm data receiving service module D. At this time, the second interactive instruction includes the first terminal device serial number (the serial number of the source terminal corresponding to the displayed image).
2. The AI algorithm data receiving service module D analyzes the second interactive instruction and based on the first terminal device serial number and the second mapping relationship, obtains a peripheral device serial number.
3. The second interactive instruction and the peripheral device serial number are sent to the message queue and message broadcast is performed.
4. Each video processing service in the video service processing module C completes the following operations after receiving the broadcast message:

4.1 Recognition on the target object in the video stream is stopped and the original video stream is restored.

4.2 The local stored data (target video stream, temporary cache and feature vector and the like) is cleared.

5. Flow end

Figure 19:
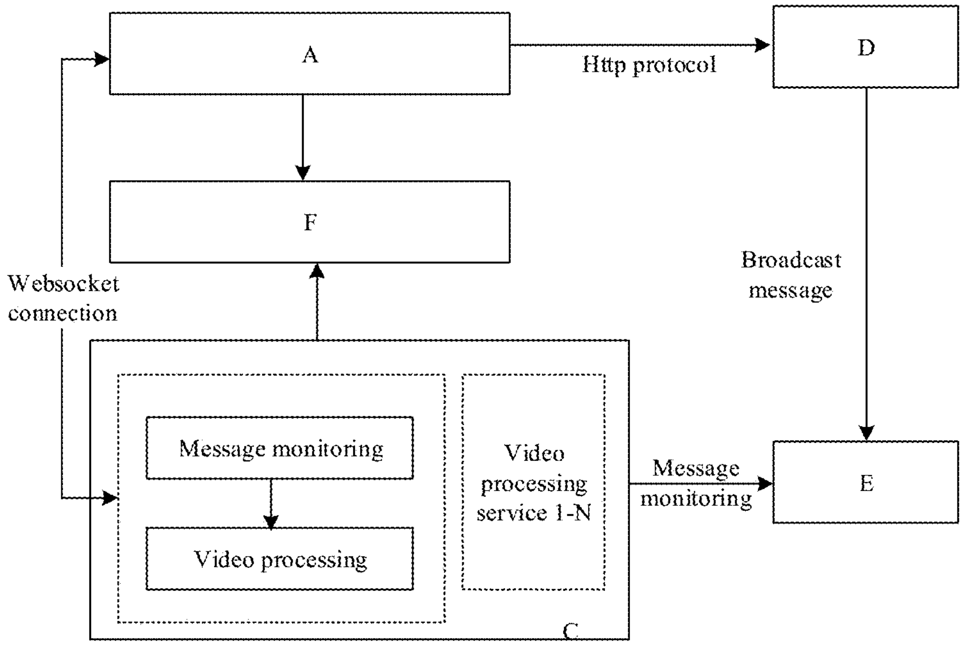
FIG. 19 is a block diagram illustrating another system for interactively searching for a target object according to some embodiments of the present disclosure.
Figure 20:
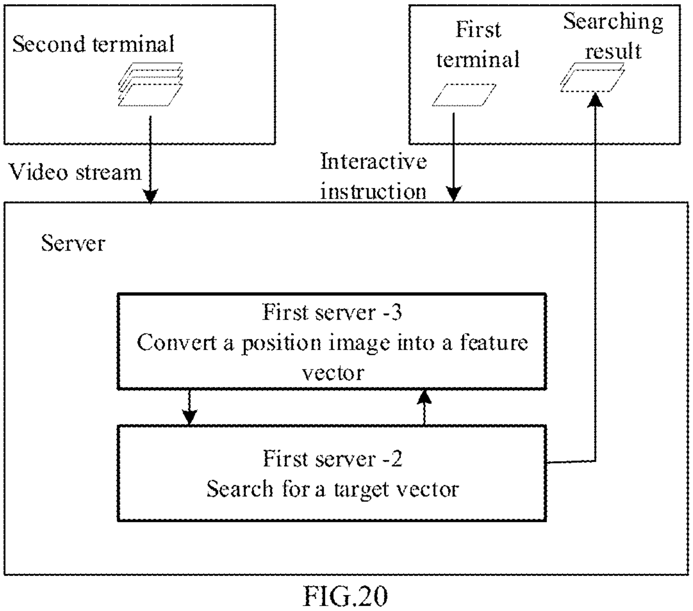
FIG. 20 is a block diagram illustrating another system for interactively searching for a target object according to some embodiments of the present disclosure.

In some embodiments, as shown in FIG. 19, the real-time video display module A establishes websocket connection with the camera real-time video stream module F. As shown in FIG. 19, the work flow of the system includes:

1. Same as step 1 in the system flow I;
2. Same as step 2 in the system flow I;
3. Same as step 3 in the system flow I;

4. Same as step 4 in the system flow I; but the differences are as follows:
4.3.1 A recognition box is set at the position of the result with maximum similarity, and the coordinate data of the recognition region and the URL address are pushed to the real-time video display module A through websocket connection at a predetermined time interval (e.g. N seconds).
4.3.2 The real-time video display module A receives the coordinate data of the recognition box and displays a video box on the video image to mark the target object.
4.3.3 The real-time video display module A receives the URL address and displays the position image in the picture.
5. Flow end A system for interactively searching for a target object is deployed below in combination with a vehicle-searching scenario and the above method of interactively searching for a target object. As shown in FIG. 20, the system includes: a first terminal, a second terminal and a server. The server may be implemented by a first server −3 and a first server −2 in FIG. 16. It should be noted that a system set by a parking lot may be used to know, in real time, the position information (for example, based on the above message queue mechanism, the camera disposed at a known position in the parking lot is used to achieve notification/switching between adjacent/overlapping cameras) of the user (vehicle searcher) and realize positioning the first terminal.

In vehicle-searching scenarios, the vehicle is located in an underground parking lot. The scenarios may include: scenario 1 where no GPS signal is present in the parking lot; scenario 2 where there is no GPS signal but WiFi signal (or Bluetooth signal) in the parking lot; scenario 3, where if there is no WiFi signal, the first terminal uses a camera and an application program to perform offline navigation.

With the scenario 3 as an example, the first terminal may construct an offline map. For example, a visual positioning system, (if any) a Bluetooth positioning system and a parking lot system are constructed into a same world coordinate and thus, based on the world coordinate, the functions such as positioning/notification/switching and the like are achieved without error. For another example, the parking lot can be divided and numbered (for example, an area of 10 m times 10 m is called a sub-region) and then within each sub-region, an offline sparse three-dimensional feature point map is constructed based on VSLAM algorithm matching sparse feature; then, the key frames (the first images corresponding to the URL addresses), the three-dimensional map points and relevant parameters are stored as offline map data to obtain a visual sub-map database, where the visual sub-map database may be stored into the server.

As shown in FIG. 20, the work flow of the system includes the followings.

1. The user uses the first terminal to scan a two-dimensional code of a particular second terminal (e.g. vertical screen) to obtain a current position.
2. The server obtains the current position of the first terminal in the following manner:
2.1 Based on Bluetooth positioning: for example, the first terminal may receive Bluetooth signals from Bluetooth signal sources (i.e. reference signal sources) disposed at different positions in the parking lot, sort the received Bluetooth signals based on strength and obtain the position data of the bluetooth signal sources corresponding to the first three bluetooth signals with large strengths, and then, based on the formula of the weighted centroid algorithm, calculate the current position of the first terminal:

$$x_b = \frac{\frac{x_1}{d_1} + \frac{x_2}{d_2} + \frac{x_3}{d_3}}{\frac{1}{d_1} + \frac{1}{d_2} + \frac{1}{d_3}}$$

$$y_b = \frac{\frac{y_1}{d_1} + \frac{y_2}{d_2} + \frac{y_3}{d_3}}{\frac{1}{d_1} + \frac{1}{d_2} + \frac{1}{d_3}}$$

in the formula, $x_b$, $y_b$ refer to an abscissa and an ordinate of the position of the first terminal respectively, $x_1$, $x_2$, $x_3$ refer to abscissas of the first reference signal source, the second reference signal source and the third reference signal source respectively, $y_1$, $y_2$, $y_3$ refer to ordinates of the first reference signal source, the second reference signal source and the third reference signal source respectively, $d_1$, $d_2$, $d_3$ refer to distances between the first terminal and the first reference signal source, the second reference signal source and the third reference signal source respectively.
2.2 Based on visual positioning: the server may, based on the picture information collected by a plurality of second terminals in the parking lot, position the current position ($x_b$, $y_b$) of the first terminal.
3. The current position ($x_b$, $y_b$) of the first terminal, the current image obtained by the camera of the first terminal, and a movement direction (an included angle with the positive direction of the x axis) obtained by a pose sensor (e.g. magnetometer) of the first terminal are sent to the server.
4. The server, based on the current position of the first terminal, switches a video of the closest second terminal to the first terminal for displaying.
5. The server may obtain target sub-map data based on the current image of the first terminal and feed it back to the first terminal for displaying. For example, the server extracts a feature of the current image to obtain a feature vector and performs matching in the visual sub-map database to obtain a target sub-map.
6. The server may, based on the movement direction, the current image and the position of the vehicle in the parking lot, generate a navigation identifier and feed it back to the first terminal with the final display effect as shown in FIG. 13.

It should be noted that in step 5, the first terminal may be pre-installed with an application program (APP) to pre-download some sub-maps of the visual sub-map database to a local memory, and the pre-downloaded sub-maps are data obtained by obtaining sparse features based on VSLAM algorithm, which is lightweight data packet and can reduce occupation for the local memory. The first terminal may obtain a recognition code of a target sub-map returned by the server to select a target sub-image. Of course, the first terminal may also obtain a plurality of feature points of the current image and then based on the feature points, perform matching in the local memory to obtain the target sub-map and load it for displaying. Thus, the first terminal can achieve data processing without relying on the WiFi network in the parking lot. Furthermore, since the pre-stored sub-maps use only the feature points, the matching time can be reduced and the matching efficiency can be increased.

In some embodiments, model training may be performed for the querying and matching process in advance, such that for different frames (for example, due to different angles or different light rays), no better matching target sub-map can be obtained in the visual sub-map database, so as to improve the matching efficiency.

In some embodiments, the images of different regions in the parking lot can be classified, for example, classified into a first-class region based on triangular feature point, and into a second-class region based on rhombus and the like. When the camera of the first terminal detects the triangular feature points of the first-class region, it can perform matching in the sub-maps of the first classification in the visual sub-map database, so as to greatly increase the matching speed.

On the above method of interactively searching a target object, the present disclosure further provides a method of interactively searching for a target object, which is applied to a first terminal side. The method includes:

in response to a trigger operation of a user, generating and obtaining a first interactive instruction and sending the first interactive instruction to a server such that the server obtains target information of a target object corresponding to the first interactive instruction;

displaying the target information of the target object in a current display picture.

In some embodiments, the first interactive instruction includes: coordinate data of a recognition region, user data obtained by code scanning, or both.

In some embodiments, the target information includes at least one of: a current position of the target object, picture information of the current position, a historical trajectory of the target object, a navigation route for searching for the target object, or any combination thereof.

In some embodiments, the first terminal further includes an offline predetermined visual sub-map database, and when the target information includes a sub-map recognition code of a target sub-map, displaying the target information of the target object includes:

based on the sub-map recognition code, matching the sub-maps in the predetermined visual sub-map database to obtain a visual sub-map;

displaying the visual sub-map.

In some embodiments, the target information includes a navigation route, and displaying the target information of the target object includes:

superimposing the navigation route onto the visual sub-map for displaying.

In some embodiments, the target information includes a navigation identifier and displaying the target information of the target object includes:

based on an orientation of the first terminal and the navigation route, generating a navigation identifier, where the navigation identifier is used to assist a user in determining a movement route and a movement direction;

superimposing the navigation identifier onto the visual sub-map for displaying.

In some embodiments, the method further includes:

in response to a trigger operation of the user, generating and obtaining a second interactive instruction, and sending the second interactive instruction to the server such that the server stops obtaining the target information of the target object in response to the second interactive instruction.

It should be noted that the method shown herein matches the contents of the method shown in FIG. 1 and thus can be referred to the contents of the above method and will not be repeated herein.

On the basis of the above method of interactively searching for a target object, the present disclosure further provides a system for interactively searching for a target object, which includes a server, a first terminal and a second terminal; where, the first terminal is used to obtain a first interactive instruction and send the first interactive instruction to the server and display target information of a target object corresponding to the first interactive instruction;

the second terminal is used to collect an image and upload the image to the server;

the server is used to determine the target information of the target object corresponding to the first interactive instruction and feed the target information back to the first terminal.

In some embodiments, the second terminal includes at least one of: mobile terminal, vertical screen, spliced screen, camera, or any combination thereof.

In some embodiments, the server includes a feature vector obtaining module, a feature vector search engine and an object database;

the feature vector obtaining module is configured to obtain a target object in a current image corresponding to the first interactive instruction and convert a position image of a position of the target object into a feature vector to obtain a target feature vector;

the object database is configured to store a position image and a feature vector of the position image, where the position image is an image of an object obtained by recognizing the image collected by the second terminal;

the feature vector search engine is configured to match the target feature vector with the feature vectors in the object database to obtain a feature vector with maximum similarity and a corresponding position image; and based on the position image, determine the target information of the target object.

It should be noted that the system shown herein matches the contents of the above method and can be referred to the contents of the above method and will not be repeated herein.

Figure 21:
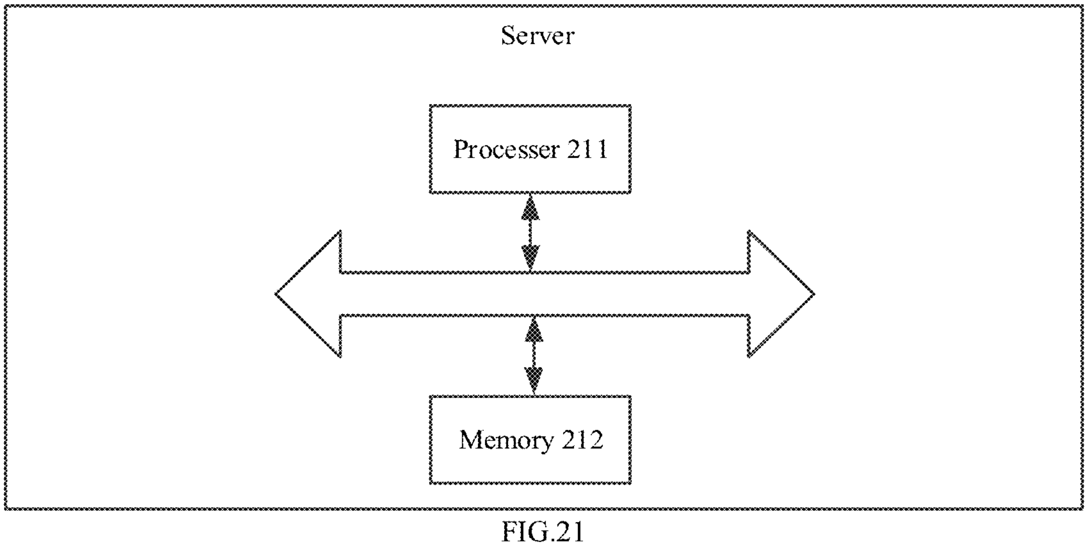
FIG. 21 is a block diagram illustrating a security protection system according to some embodiments of the present disclosure.

In some embodiments, there is further provided a security protection system, including a first terminal, a second terminal and a server. As shown in FIG. 21, the server includes:

a processor 211;

a memory 212, configured to store computer programs executable by the processor;

where the processor is configured to execute the computer programs in the memory to perform the method shown in FIGS. 1 to 15.

In some embodiments, there is further provided a first terminal, including:

a processor;

a memory, configured to store computer programs executable by the processor;

where the processor is configured to execute the computer programs in the memory to perform the methods.

In some embodiments, there is further provided a non-volatile computer readable storage medium, for example, a memory containing executable computer programs. The executable computer programs may be executed by a processor to perform the method as shown in FIG. 1. The readable storage medium may be a Read-Only Memory (ROM), a Random Access Memory (RAM), a Compact Disc Read-Only Memory (CD-ROM), a magnetic tape, a floppy disk, and optical data storage device and the like.

Since the apparatus embodiments substantially correspond to the method embodiments, reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of interactively searching for a target object, which is applied to a server side and comprising:

obtaining a first interactive instruction from a first terminal;

determining a target object corresponding to the first interactive instruction;

obtaining target information of the target object, wherein the target information is selected from a group consisting of a current position of the target object, picture information of the current position, a historical trajectory of the target object, a navigation route, and any combination thereof; and sending the target information to the first terminal;

wherein obtaining the target information of the target object comprises:

obtaining a current image corresponding to the first interactive instruction; wherein the current image comprises a current video frame or image frame specified when the first interactive instruction is input, or an image uploaded when the first interactive instruction is input;

based on a predetermined second mapping relationship between the first terminal and a second terminal, obtaining scenario information of a scenario where the second terminal is located according to position data of second terminals distributed at different positions, wherein the second mapping relationship comprises a serial number of the first terminal, serial numbers of the second terminals, and a physical position of each terminal; and based on the scenario information, obtaining the target information of the target object.

2. The method of claim 1, wherein determining the target object corresponding to the first interactive instruction comprises:

obtaining a current image corresponding to the first interactive instruction; wherein the current image comprises a current video frame or image frame specified when the first interactive instruction is input, or an image uploaded when the first interactive instruction is input;

recognizing a target object in the current image to obtain a position image of a position of the target object; and extracting a feature vector of the position image and representing the target object by using the feature vector of the position image;

or, wherein determining the target object corresponding to the first interactive instruction comprises:

obtaining a multimedia file address corresponding to the first interactive instruction;

based on the multimedia file address, obtaining a first video frame;

based on coordinate data of a recognition region comprised in the first interactive instruction and the first video frame, determining a position image corresponding to the recognition region; and extracting a feature vector of the position image and representing the target object by using the feature vector of the position image.

3. The method of claim 2, wherein obtaining the target information of the target object comprises:

obtaining a first terminal device serial number corresponding to the first interactive instruction;

based on the first terminal device serial number, obtaining a peripheral device serial number of a peripheral device around at least one second terminal around the first terminal; and taking the peripheral device serial number and the feature vector of the position image as the target information of the target object.

4. The method of claim 1, wherein the scenario information comprises picture information and obtaining the target information of the target object based on the scenario information comprises:

obtaining at least one object of the picture information in the scenario information, wherein the at least one object comprises the target object, and based on a time sequence in which the target object appears in each piece of scenario information, generating a historical trajectory of the target object and taking the historical trajectory as the target information of the target object; or extracting at least one object of the picture information in the scenario information and obtaining a position image corresponding to each object, determining a target position image matching the current image, and based on a correspondence between the scenario information and the second terminal, determining position data of the second terminal corresponding to the target position image, and taking the position data of the second terminal as the target information of the target object; or obtaining picture information of the second terminal closest to the first terminal and taking the picture information as the target information of the target object.

5. The method of claim 4, wherein the target information comprises the navigation route, and obtaining the target information of the target object based on the scenario information further comprises:

obtaining position data of the first terminal; and based on the position data of the first terminal and the position data of the second terminal corresponding to the target position image, determining a navigation route between the first terminal and the second terminal, and taking the navigation route as the target information of the target object;

wherein the target information further comprises a navigation identifier, and obtaining the target information of the target object based on the scenario information further comprises:

based on an orientation of the first terminal and the navigation route, generating a navigation identifier and taking the navigation identifier as the target information of the target object, wherein the navigation identifier is used to assist a user in determining a movement route and a movement direction.

6. The method of claim 1, wherein the target information comprises the current position of the target object, and obtaining the target information of the target object comprises:

obtaining position data of at least three reference signal sources close to the first terminal; wherein the reference signal sources are disposed in advance at known positions; and based on the position data of at least three reference signal sources, determining position data of the first terminal and taking the position data of the first terminal as the current position of the target object;

wherein obtaining the position data of at least three reference signal sources close to the first terminal comprises:

obtaining signal strengths of reference signals received by the first terminal from reference signal sources;

sorting the signal strengths and selecting reference signal sources corresponding to at least three signal strengths based on a descending order to obtain the position data of the at least three reference signal sources;

wherein based on the position data of at least three reference signal sources, determining the position data of the first terminal comprises:

obtaining a distance between the first terminal and each of the at least three reference signal sources;

based on the position data of at least three reference signal sources and corresponding distances, calculating coordinate data of the first terminal to obtain the position data of the first terminal.

7. The method of claim 6, wherein calculating the position data of the first terminal is based on predetermined weighted centroid algorithm;

wherein a formula of the weighted centroid algorithm is as follows:

$$x_b = \frac{\frac{x_1}{d_1} + \frac{x_2}{d_2} + \frac{x_3}{d_3}}{\frac{1}{d_1} + \frac{1}{d_2} + \frac{1}{d_3}}$$

$$y_b = \frac{\frac{y_1}{d_1} + \frac{y_2}{d_2} + \frac{y_3}{d_3}}{\frac{1}{d_1} + \frac{1}{d_2} + \frac{1}{d_3}}$$

wherein $x_b$, $y_b$ refer to an abscissa and an ordinate of the position of the first terminal respectively, $x_1$, $x_2$, $x_3$ refer to abscissas of a first reference signal source, a second reference signal source and a third reference signal source respectively, $y_1$, $y_2$, $y_3$ refer to ordinates of the first reference signal source, the second reference signal source and the third reference signal source respectively, $d_1$, $d_2$, $d_3$ refer to distances between the first terminal and the first reference signal source, the second reference signal source and the third reference signal source respectively.

8. The method of claim 1, wherein the scenario information comprises picture information and obtaining the target information of the target object based on the scenario information comprises:

obtaining picture information of the second terminal closest to the first terminal; and based on the picture information, obtaining target sub-map data of a place where the second terminal is located and taking the target sub-map data as the target information of the target object.

9. The method of claim 8, wherein based on the picture information, obtaining the target sub-map data of the place where the second terminal is located comprises:

obtaining a feature vector of the picture information;

matching the feature vector of the picture information with feature vectors in a predetermined visual sub-map database to obtain a feature vector with maximum similarity; and obtaining sub-map data corresponding to the feature vector with maximum similarity to obtain the target sub-map data.

10. The method of claim 9, wherein matching the feature vector of the picture information with the feature vectors in the predetermined visual sub-map database to obtain the feature vector with maximum similarity comprises:

obtaining a feature point of the picture information and determining a classification of the feature point;

obtaining sub-map data of the classification in the visual sub-map database; and matching the feature vector of the picture information with feature vectors in the sub-map data of the classification to obtain a feature vector with maximum similarity.

11. The method of claim 1, wherein obtaining the target information of the target object comprises:

determining a recognition region corresponding to the first interactive instruction, wherein the target object is located within the recognition region; and obtaining second coordinate data of the recognition region and taking the second coordinate data of the recognition region as the target information of the target object;

wherein obtaining the second coordinate data of the recognition region comprises:

obtaining first coordinate data of each vertex in the recognition region; wherein the first interactive instruction is the first coordinate data of the recognition region, and the first coordinate data is located within a predetermined range; and adjusting the first coordinate data of each vertex based on a size of a picture in the first terminal to obtain the second coordinate data.

12. The method of claim 1, wherein the scenario information comprises picture information and based on the position data of the second terminals distributed at different positions and the second mapping relationship, obtaining the scenario information of the scenario of the second terminal comprises:

obtaining a feature vector of the current image corresponding to the first interactive instruction;

obtaining candidate feature vectors matching the feature vector of the current image in an object database to obtain a target feature vector, wherein the object database comprises candidate feature vectors corresponding to picture information uploaded by the second terminal; and obtaining the picture information corresponding to the target feature vector and taking the picture information as the scenario information.

13. The method of claim 12, wherein obtaining the candidate feature vectors matching the feature vector of the current image in the object database to obtain the target feature vector comprises:

updating the object database, wherein the object database comprises candidate feature vectors;

matching the feature vector of the target object with the candidate feature vectors in the object database to obtain a first number of candidate feature vectors; and obtaining a candidate feature vector with maximum similarity as the target feature vector from the first number of candidate feature vectors.

14. The method of claim 13, wherein the object database comprises a first database and updating the object database comprises:

obtaining an image where the target object is located, wherein the image where the target object is located is a first image of a current stream address corresponding to the first interactive instruction;

recognizing a second number of objects in the first image to obtain a second number of position images;

extracting a feature of each position image to obtain a second number of feature vectors; and updating the second number of feature vectors to the first database and obtaining feature vector IDs.

15. The method of claim 14, wherein the object database comprises a second database and updating the object database further comprises:

storing the second number of position images into the second database and obtaining an accessible URL address of each position image returned by the second database and a feature vector ID generated when the feature vector of each position image is updated to the first database; and based on the feature vector ID and the URL address, generating a second number of pieces of data and storing the second number of pieces of data into the second database.

16. The method of claim 1, further comprising:

when detecting a second interactive instruction from the first terminal, stopping obtaining the target information of the target object;

wherein stopping obtaining the target information of the target object comprises:

obtaining a peripheral device serial number of a peripheral device around a second terminal bound to the first terminal; and restoring a multimedia file of the second terminal corresponding to the peripheral device serial number into an original multimedia file and removing corresponding stored data.

17. A security protection system, comprising a first terminal, a second terminal, a server comprising a processor, and a non-transitory memory storing computer programs executable by the processor; wherein the processor is configured to execute the computer programs in the non-transitory memory to perform the method of the claim 1.

18. A method of interactively searching for a target object, which is applied to a server side and comprising:

obtaining a first interactive instruction from a first terminal;

determining a target object corresponding to the first interactive instruction;

obtaining target information of the target object, wherein the target information is selected from a group consisting of a current position of the target object, picture information of the current position, a historical trajectory of the target object, a navigation route, and any combination thereof; and sending the target information to the first terminal such that the first terminal displays the target information;

wherein determining the target object corresponding to the first interactive instruction comprises:

obtaining a current image corresponding to the first interactive instruction; wherein the current image comprises a current video frame or image frame specified when the first interactive instruction is input, or an image uploaded when the first interactive instruction is input;

recognizing a target object in the current image to obtain a position image of a position of the target object; and extracting a feature vector of the position image and representing the target object by using the feature vector of the position image;

or, wherein determining the target object corresponding to the first interactive instruction comprises:

obtaining a multimedia file address corresponding to the first interactive instruction;

based on the multimedia file address, obtaining a first video frame;

based on coordinate data of a recognition region comprised in the first interactive instruction and the first video frame, determining a position image corresponding to the recognition region; and extracting a feature vector of the position image and representing the target object by using the feature vector of the position image.

19. A method of interactively searching for a target object, which is applied to a server side and comprising:

obtaining a first interactive instruction from a first terminal;

determining a target object corresponding to the first interactive instruction;

obtaining target information of the target object, wherein the target information is selected from a group consisting of a current position of the target object, picture information of the current position, a historical trajectory of the target object, a navigation route, and any combination thereof; and sending the target information to the first terminal such that the first terminal displays the target information;

wherein the target information comprises the current position of the target object, and obtaining the target information of the target object comprises: obtaining position data of at least three reference signal sources close to the first terminal; wherein the reference signal sources are disposed in advance at known positions; and based on the position data of at least three reference signal sources, determining position data of the first terminal and taking the position data of the first terminal as the current position of the target object; wherein obtaining the position data of at least three reference signal sources close to the first terminal comprises: obtaining signal strengths of reference signals received by the first terminal from reference signal sources; sorting the signal strengths and selecting reference signal sources corresponding to at least three signal strengths based on a descending order to obtain the position data of the at least three reference signal sources; wherein based on the position data of at least three reference signal sources, determining the position data of the first terminal comprises: obtaining a distance between the first terminal and each of the at least three reference signal sources; based on the position data of at least three reference signal sources and corresponding distances, calculating coordinate data of the first terminal to obtain the position data of the first terminal, or wherein obtaining the target information of the target object comprises: determining a recognition region corresponding to the first interactive instruction, wherein the target object is located within the recognition region; and obtaining second coordinate data of the recognition region and taking the second coordinate data of the recognition region as the target information of the target object; wherein obtaining the second coordinate data of the recognition region comprises: obtaining first coordinate data of each vertex in the recognition region; wherein the first interactive instruction is the first coordinate data of the recognition region, and the first coordinate data is located within a predetermined range; and adjusting the first coordinate data of each vertex based on a size of a picture in the first terminal to obtain the second coordinate data.

* * * * *